US010668367B2

(12) United States Patent
Linden et al.

(10) Patent No.: US 10,668,367 B2
(45) Date of Patent: Jun. 2, 2020

(54) SYSTEM AND METHOD FOR UNIQUELY IDENTIFYING PHYSICAL TRADING CARDS AND INCORPORATING TRADING CARD GAME ITEMS IN A VIDEO GAME

(71) Applicant: ACTIVISION PUBLISHING, INC., Santa Monica, CA (US)

(72) Inventors: John P. Linden, Sherman Oaks, CA (US); James R. Watkins, III, San Francisco, CA (US); Ryan H. Medeiros, Santa Monica, CA (US); Paul G. Pasteris, Redondo Beach, CA (US)

(73) Assignee: ACTIVISION PUBLISHING, INC., Santa Monica, CA (US)

( * ) Notice: Subject to any disclaimer, the term of this patent is extended or adjusted under 35 U.S.C. 154(b) by 785 days.

(21) Appl. No.: 14/883,115

(22) Filed: Oct. 14, 2015

(65) Prior Publication Data

US 2016/0361631 A1 Dec. 15, 2016

Related U.S. Application Data

(60) Provisional application No. 62/175,904, filed on Jun. 15, 2015.

(51) Int. Cl.
*A63F 13/00* (2014.01)
*A63F 9/24* (2006.01)
(Continued)

(52) U.S. Cl.
CPC ............ *A63F 13/213* (2014.09); *A63F 1/02* (2013.01); *A63F 13/23* (2014.09); *A63F 13/25* (2014.09);
(Continued)

(58) Field of Classification Search
CPC .. A63F 13/23; A63F 13/69; A63F 1/02; A63F 13/213; A63F 13/25; A63F 13/95; H04L 29/06034
See application file for complete search history.

(56) References Cited

U.S. PATENT DOCUMENTS

| 5,530,796 A | 6/1996 | Wang |
| 5,561,736 A | 10/1996 | Moore |

(Continued)

FOREIGN PATENT DOCUMENTS

| AU | 768367 | 3/2004 |
| AU | 2005215048 | 10/2011 |

(Continued)

OTHER PUBLICATIONS

Office Action dated Feb. 20, 2018 for U.S. Appl. No. 15/188,570; (pp. 1-8).

(Continued)

*Primary Examiner* — Milap Shah
(74) *Attorney, Agent, or Firm* — Novel IP

(57) ABSTRACT

A system and method for uniquely identifying physical trading cards and/or incorporating trading card game items in a video game is provided. In certain implementations, a unique code that identifies a trading card may be obtained. A graphical representation of the unique code may be generated based on a graphical coding scheme. The graphical representation of the unique code may comprise at least a part of: (1) a depiction of a game item that is usable in the video game; or (2) a border of the trading card. Content associated with the depiction of the game item may be obtained. The trading card may be generated based on the content associated with the depiction of the game item and the graphical representation of the unique code such that the
(Continued)

generated trading card depicts the game item and the graphical representation of the unique code.

21 Claims, 10 Drawing Sheets

(51) Int. Cl.
    *A63F 13/213*     (2014.01)
    *A63F 1/02*     (2006.01)
    *A63F 13/69*     (2014.01)
    *A63F 13/95*     (2014.01)
    *A63F 13/25*     (2014.01)
    *A63F 13/23*     (2014.01)
    *A63F 11/00*     (2006.01)

(52) U.S. Cl.
    CPC .............. *A63F 13/69* (2014.09); *A63F 13/95* (2014.09); *A63F 2009/2425* (2013.01); *A63F 2011/0072* (2013.01)

(56) References Cited

U.S. PATENT DOCUMENTS

| | | | |
|---|---|---|---|
| 5,563,946 | A | 10/1996 | Cooper |
| 5,685,775 | A | 11/1997 | Bakoglu |
| 5,706,507 | A | 1/1998 | Schloss |
| 5,708,764 | A | 1/1998 | Borrel |
| 5,736,985 | A | 4/1998 | Lection |
| 5,737,416 | A | 4/1998 | Cooper |
| 5,745,678 | A | 4/1998 | Herzberg |
| 5,748,731 | A * | 5/1998 | Shepherd ............... G06Q 30/06 705/57 |
| 5,762,552 | A | 6/1998 | Vuong |
| 5,768,511 | A | 6/1998 | Galvin |
| 5,825,877 | A | 10/1998 | Dan |
| 5,835,692 | A | 11/1998 | Cragun |
| 5,878,233 | A | 3/1999 | Schloss |
| 5,883,628 | A | 3/1999 | Mullaly |
| 5,900,879 | A | 5/1999 | Berry |
| 5,903,266 | A | 5/1999 | Berstis |
| 5,903,271 | A | 5/1999 | Bardon |
| 5,911,045 | A | 6/1999 | Leyba |
| 5,920,325 | A | 7/1999 | Morgan |
| 5,923,324 | A | 7/1999 | Berry |
| 5,969,724 | A | 10/1999 | Berry |
| 5,977,979 | A | 11/1999 | Clough |
| 5,990,888 | A | 11/1999 | Blades |
| 6,014,145 | A | 1/2000 | Bardon |
| 6,025,839 | A | 2/2000 | Schell |
| 6,059,842 | A | 5/2000 | Dumarot |
| 6,069,632 | A | 5/2000 | Mullaly |
| 6,081,270 | A | 6/2000 | Berry |
| 6,081,271 | A | 6/2000 | Bardon |
| 6,091,410 | A | 7/2000 | Lection |
| 6,094,196 | A | 7/2000 | Berry |
| 6,098,056 | A | 8/2000 | Rusnak |
| 6,104,406 | A | 8/2000 | Berry |
| 6,111,581 | A | 8/2000 | Berry |
| 6,134,588 | A | 10/2000 | Guenthner |
| 6,144,381 | A | 11/2000 | Lection |
| 6,148,328 | A | 11/2000 | Cuomo |
| 6,179,713 | B1 | 1/2001 | James |
| 6,185,614 | B1 | 2/2001 | Cuomo |
| 6,200,216 | B1 * | 3/2001 | Peppel ............... A63F 9/24 463/1 |
| 6,201,881 | B1 | 3/2001 | Masuda |
| 6,222,551 | B1 | 4/2001 | Schneider |
| 6,271,842 | B1 | 8/2001 | Bardon |
| 6,271,843 | B1 | 8/2001 | Lection |
| 6,282,547 | B1 | 8/2001 | Hirsch |
| 6,311,206 | B1 | 10/2001 | Malkin |
| 6,334,141 | B1 | 12/2001 | Varma |
| 6,336,134 | B1 | 1/2002 | Varma |
| 6,337,700 | B1 | 1/2002 | Kinoe |
| 6,353,449 | B1 | 3/2002 | Gregg |
| 6,356,297 | B1 | 3/2002 | Cheng |
| 6,411,312 | B1 | 6/2002 | Sheppard |
| 6,426,757 | B1 | 7/2002 | Smith |
| 6,445,389 | B1 | 9/2002 | Bossen |
| 6,452,593 | B1 | 9/2002 | Challener |
| 6,462,760 | B1 | 10/2002 | Cox, Jr. |
| 6,466,550 | B1 | 10/2002 | Foster |
| 6,469,712 | B1 | 10/2002 | Hilpert, Jr. |
| 6,473,085 | B1 | 10/2002 | Brock |
| 6,499,053 | B1 | 12/2002 | Marquette |
| 6,505,208 | B1 | 1/2003 | Kanevsky |
| 6,509,925 | B1 | 1/2003 | Dermler |
| 6,525,731 | B1 | 2/2003 | Suits |
| 6,546,400 | B1 * | 4/2003 | Aberson ................ A63F 13/10 |
| 6,549,933 | B1 | 4/2003 | Barrett |
| 6,567,109 | B1 | 5/2003 | Todd |
| 6,567,813 | B1 | 5/2003 | Zhu |
| 6,612,501 | B1 | 9/2003 | Woll et al. ................. 235/494 |
| 6,618,751 | B1 | 9/2003 | Challenger |
| RE38,375 | E | 12/2003 | Herzberg |
| 6,657,617 | B2 | 12/2003 | Paolini |
| 6,657,642 | B1 | 12/2003 | Bardon |
| 6,684,255 | B1 | 1/2004 | Martin |
| 6,709,336 | B2 * | 3/2004 | Siegel ................... A63F 13/08 463/1 |
| 6,717,600 | B2 | 4/2004 | Dutta |
| 6,734,884 | B1 | 5/2004 | Berry |
| 6,765,596 | B2 | 7/2004 | Lection |
| 6,781,607 | B1 | 8/2004 | Benham |
| 6,819,669 | B2 | 11/2004 | Rooney |
| 6,832,239 | B1 | 12/2004 | Kraft |
| 6,836,480 | B2 | 12/2004 | Basso |
| 6,845,389 | B1 | 1/2005 | Sen |
| 6,886,026 | B1 | 4/2005 | Hanson |
| 6,948,168 | B1 | 9/2005 | Kuprionas |
| RE38,865 | E | 11/2005 | Dumarot |
| 6,993,596 | B2 | 1/2006 | Hinton |
| 7,006,616 | B1 | 2/2006 | Christofferson |
| 7,028,296 | B2 | 4/2006 | Irfan |
| 7,062,533 | B2 | 6/2006 | Brown |
| 7,143,409 | B2 | 11/2006 | Herrero |
| 7,209,137 | B2 | 4/2007 | Brokenshire |
| 7,230,616 | B2 | 6/2007 | Taubin |
| 7,249,123 | B2 | 7/2007 | Elder |
| 7,263,511 | B2 | 8/2007 | Bodin |
| 7,287,053 | B2 | 10/2007 | Bodin |
| 7,305,438 | B2 | 12/2007 | Christensen |
| 7,308,476 | B2 | 12/2007 | Mannaru |
| 7,314,407 | B1 * | 1/2008 | Pearson ................ A63F 13/12 463/29 |
| 7,404,149 | B2 | 7/2008 | Fox |
| 7,426,538 | B2 | 9/2008 | Bodin |
| 7,427,980 | B1 | 9/2008 | Partridge |
| 7,428,588 | B2 | 9/2008 | Berstis |
| 7,429,987 | B2 | 9/2008 | Leah |
| 7,436,407 | B2 | 10/2008 | Doi |
| 7,439,975 | B2 | 10/2008 | Hsu |
| 7,443,393 | B2 | 10/2008 | Shen |
| 7,447,996 | B1 | 11/2008 | Cox |
| 7,467,181 | B2 | 12/2008 | McGowan |
| 7,475,354 | B2 | 1/2009 | Guido |
| 7,478,127 | B2 | 1/2009 | Creamer |
| 7,484,012 | B2 | 1/2009 | Hinton |
| 7,502,759 | B2 | 3/2009 | Hannigan et al. .............. 705/51 |
| 7,503,007 | B2 | 3/2009 | Goodman |
| 7,506,264 | B2 | 3/2009 | Polan |
| 7,515,136 | B1 | 4/2009 | Kanevsky |
| 7,525,964 | B2 | 4/2009 | Astley |
| 7,552,177 | B2 | 6/2009 | Kessen |
| 7,565,650 | B2 | 7/2009 | Bhogal |
| 7,571,224 | B2 | 8/2009 | Childress |
| 7,571,389 | B2 | 8/2009 | Broussard |
| 7,580,888 | B2 | 8/2009 | Ur |
| 7,596,596 | B2 | 9/2009 | Chen |
| 7,640,587 | B2 | 12/2009 | Fox |
| 7,667,701 | B2 | 2/2010 | Leah |
| 7,698,656 | B2 | 4/2010 | Srivastava |

(56) References Cited

U.S. PATENT DOCUMENTS

| | | |
|---|---|---|
| 7,702,784 B2 | 4/2010 | Berstis |
| 7,714,867 B2 | 5/2010 | Doi |
| 7,719,532 B2 | 5/2010 | Schardt |
| 7,719,535 B2 | 5/2010 | Tadokoro |
| 7,734,691 B2 | 6/2010 | Creamer |
| 7,737,969 B2 | 6/2010 | Shen |
| 7,743,095 B2 | 6/2010 | Goldberg |
| 7,747,679 B2 | 6/2010 | Galvin |
| 7,765,478 B2 | 7/2010 | Reed |
| 7,768,514 B2 | 8/2010 | Pagan |
| 7,773,087 B2 | 8/2010 | Fowler |
| 7,774,407 B2 | 8/2010 | Daly |
| 7,782,318 B2 | 8/2010 | Shearer |
| 7,792,263 B2 | 9/2010 | D Amora |
| 7,792,801 B2 | 9/2010 | Hamilton, II |
| 7,796,128 B2 | 9/2010 | Radzikowski |
| 7,808,500 B2 | 10/2010 | Shearer |
| 7,814,152 B2 | 10/2010 | McGowan |
| 7,827,318 B2 | 11/2010 | Hinton |
| 7,843,471 B2 | 11/2010 | Doan |
| 7,844,663 B2 | 11/2010 | Boutboul |
| 7,847,799 B2 | 12/2010 | Taubin |
| 7,856,469 B2 | 12/2010 | Chen |
| 7,873,485 B2 | 1/2011 | Castelli |
| 7,882,222 B2 | 2/2011 | Dolbier |
| 7,882,243 B2 | 2/2011 | Ivory |
| 7,884,819 B2 | 2/2011 | Kuesel |
| 7,886,045 B2 | 2/2011 | Bates |
| 7,890,623 B2 | 2/2011 | Bates |
| 7,893,936 B2 | 2/2011 | Shearer |
| 7,904,829 B2 | 3/2011 | Fox |
| 7,921,128 B2 | 4/2011 | Hamilton, II |
| 7,940,265 B2 | 5/2011 | Brown |
| 7,945,620 B2 | 5/2011 | Bou-Ghannam |
| 7,945,802 B2 | 5/2011 | Hamilton, II |
| 7,970,837 B2 | 6/2011 | Lyle |
| 7,970,840 B2 | 6/2011 | Cannon |
| 7,985,138 B2 | 7/2011 | Acharya |
| 7,990,387 B2 | 8/2011 | Hamilton, II |
| 7,996,164 B2 | 8/2011 | Hamilton, II |
| 8,001,161 B2 | 8/2011 | Finn |
| 8,004,518 B2 | 8/2011 | Fowler |
| 8,005,025 B2 | 8/2011 | Bodin |
| 8,006,182 B2 | 8/2011 | Bates |
| 8,013,861 B2 | 9/2011 | Hamilton, II |
| 8,018,453 B2 | 9/2011 | Fowler |
| 8,018,462 B2 | 9/2011 | Bhogal |
| 8,019,797 B2 | 9/2011 | Hamilton, II |
| 8,019,858 B2 | 9/2011 | Bauchot |
| 8,022,948 B2 | 9/2011 | Garbow |
| 8,022,950 B2 | 9/2011 | Brown |
| 8,026,913 B2 | 9/2011 | Garbow |
| 8,028,021 B2 | 9/2011 | Reisinger |
| 8,028,022 B2 | 9/2011 | Brownholtz |
| 8,037,416 B2 | 10/2011 | Bates |
| 8,041,614 B2 | 10/2011 | Bhogal |
| 8,046,700 B2 | 10/2011 | Bates |
| 8,051,462 B2 | 11/2011 | Hamilton, II |
| 8,055,656 B2 | 11/2011 | Cradick |
| 8,056,121 B2 | 11/2011 | Hamilton, II |
| 8,057,307 B2 | 11/2011 | Berstis |
| 8,062,130 B2 | 11/2011 | Smith |
| 8,063,905 B2 | 11/2011 | Brown |
| 8,070,601 B2 | 12/2011 | Acharya |
| 8,082,245 B2 | 12/2011 | Bates |
| 8,085,267 B2 | 12/2011 | Brown |
| 8,089,481 B2 | 1/2012 | Shearer |
| 8,092,288 B2 | 1/2012 | Theis |
| 8,095,881 B2 | 1/2012 | Reisinger |
| 8,099,338 B2 | 1/2012 | Betzler |
| 8,099,668 B2 | 1/2012 | Garbow |
| 8,102,334 B2 | 1/2012 | Brown |
| 8,103,640 B2 | 1/2012 | Lo |
| 8,103,959 B2 | 1/2012 | Cannon |
| 8,105,165 B2 | 1/2012 | Karstens |
| 8,108,774 B2 | 1/2012 | Finn |
| 8,113,959 B2 | 2/2012 | De Judicibus |
| 8,117,551 B2 | 2/2012 | Cheng |
| 8,125,485 B2 | 2/2012 | Brown |
| 8,127,235 B2 | 2/2012 | Haggar |
| 8,127,236 B2 | 2/2012 | Hamilton, II |
| 8,128,487 B2 | 3/2012 | Hamilton, II |
| 8,131,740 B2 | 3/2012 | Cradick |
| 8,132,235 B2 | 3/2012 | Bussani |
| 8,134,560 B2 | 3/2012 | Bates |
| 8,139,060 B2 | 3/2012 | Brown |
| 8,139,780 B2 | 3/2012 | Shearer |
| 8,140,340 B2 | 3/2012 | Bhogal |
| 8,140,620 B2 | 3/2012 | Creamer |
| 8,140,978 B2 | 3/2012 | Betzler |
| 8,140,982 B2 | 3/2012 | Hamilton, II |
| 8,145,676 B2 | 3/2012 | Bhogal |
| 8,145,725 B2 | 3/2012 | Dawson |
| 8,149,241 B2 | 4/2012 | Do |
| 8,151,191 B2 | 4/2012 | Nicol, II |
| 8,156,184 B2 | 4/2012 | Kurata |
| 8,165,350 B2 | 4/2012 | Fuhrmann |
| 8,171,407 B2 | 5/2012 | Huang |
| 8,171,408 B2 | 5/2012 | Dawson |
| 8,171,559 B2 | 5/2012 | Hamilton, II |
| 8,174,541 B2 | 5/2012 | Greene |
| 8,176,421 B2 | 5/2012 | Dawson |
| 8,176,422 B2 | 5/2012 | Bergman |
| 8,184,092 B2 | 5/2012 | Cox |
| 8,184,116 B2 | 5/2012 | Finn |
| 8,185,450 B2 | 5/2012 | McVey |
| 8,185,829 B2 | 5/2012 | Cannon |
| 8,187,067 B2 | 5/2012 | Hamilton, II |
| 8,199,145 B2 | 6/2012 | Hamilton, II |
| 8,203,561 B2 | 6/2012 | Carter |
| 8,214,335 B2 | 7/2012 | Hamilton, II |
| 8,214,433 B2 | 7/2012 | Dawson |
| 8,214,750 B2 | 7/2012 | Hamilton, II |
| 8,214,751 B2 | 7/2012 | Dawson |
| 8,217,953 B2 | 7/2012 | Comparan |
| 8,219,616 B2 | 7/2012 | Dawson |
| 8,230,045 B2 | 7/2012 | Kawachiya |
| 8,230,338 B2 | 7/2012 | Dugan |
| 8,233,005 B2 | 7/2012 | Finn |
| 8,234,234 B2 | 7/2012 | Shearer |
| 8,234,579 B2 | 7/2012 | Do |
| 8,239,775 B2 | 8/2012 | Beverland |
| 8,241,131 B2 | 8/2012 | Bhogal |
| 8,245,241 B2 | 8/2012 | Hamilton, II |
| 8,245,283 B2 | 8/2012 | Dawson |
| 8,265,253 B2 | 9/2012 | D Amora |
| 8,310,497 B2 | 11/2012 | Comparan |
| 8,334,871 B2 | 12/2012 | Hamilton, II |
| 8,360,886 B2 | 1/2013 | Karstens |
| 8,364,804 B2 | 1/2013 | Childress |
| 8,425,326 B2 | 4/2013 | Chudley |
| 8,442,946 B2 | 5/2013 | Hamilton, II |
| 8,506,372 B2 | 8/2013 | Chudley |
| 8,509,680 B2 | 8/2013 | Atsmon |
| 8,514,249 B2 | 8/2013 | Hamilton, II |
| 8,554,841 B2 | 10/2013 | Kurata |
| 8,607,142 B2 | 12/2013 | Bergman |
| 8,607,356 B2 | 12/2013 | Hamilton, II |
| 8,615,471 B2 * | 12/2013 | Hannigan .............. G06Q 30/02 463/1 |
| 8,624,903 B2 | 1/2014 | Hamilton, II |
| 8,626,836 B2 | 1/2014 | Dawson |
| 8,692,835 B2 | 4/2014 | Hamilton, II |
| 8,721,412 B2 | 5/2014 | Chudley |
| 8,827,816 B2 | 9/2014 | Bhogal |
| 8,838,640 B2 | 9/2014 | Bates |
| 8,849,917 B2 | 9/2014 | Dawson |
| 8,911,296 B2 | 12/2014 | Chudley |
| 8,992,316 B2 | 3/2015 | Smith |
| 9,083,654 B2 | 7/2015 | Dawson |
| 9,152,914 B2 | 10/2015 | Haggar |
| 9,205,328 B2 | 12/2015 | Bansi |
| 9,286,731 B2 | 3/2016 | Hamilton, II |
| 9,299,080 B2 | 3/2016 | Dawson |

(56) References Cited

U.S. PATENT DOCUMENTS

| | | | |
|---|---|---|---|
| 9,364,746 B2 | 6/2016 | Chudley | |
| 9,525,746 B2 | 12/2016 | Bates | |
| 9,583,109 B2 | 2/2017 | Kurata | |
| 9,682,324 B2 | 6/2017 | Bansi | |
| 9,764,244 B2 | 9/2017 | Bansi | |
| 9,789,406 B2 | 10/2017 | Marr | |
| 9,808,722 B2 | 11/2017 | Kawachiya | |
| 2002/0028710 A1 | 3/2002 | Ishihara | |
| 2004/0014514 A1 | 1/2004 | Yacenda | |
| 2004/0228291 A1 | 11/2004 | Huslak | |
| 2004/0246529 A1* | 12/2004 | Pruden | G06K 1/121 358/3.28 |
| 2005/0182693 A1* | 8/2005 | Alivandi | A63F 13/12 705/26.5 |
| 2006/0038833 A1* | 2/2006 | Mallinson | A63F 13/02 345/633 |
| 2006/0068860 A1 | 3/2006 | Ueshima | |
| 2006/0246970 A1* | 11/2006 | Smith | G06Q 30/02 463/1 |
| 2007/0232399 A1* | 10/2007 | Kathman | A63F 13/12 463/42 |
| 2007/0233558 A1* | 10/2007 | Jones | G06Q 30/02 705/14.27 |
| 2008/0102910 A1* | 5/2008 | Peppel | G06Q 10/06 463/1 |
| 2008/0200226 A1 | 8/2008 | Ichimura | |
| 2008/0227512 A1* | 9/2008 | Lang | G07F 17/32 463/11 |
| 2008/0284101 A1 | 11/2008 | Marx | |
| 2008/0305874 A1 | 12/2008 | Wilm | |
| 2009/0011837 A1 | 1/2009 | Marans | |
| 2009/0051114 A1* | 2/2009 | Robbers | A63F 1/00 273/293 |
| 2009/0054124 A1 | 2/2009 | Robbers | |
| 2009/0113448 A1 | 4/2009 | Smith | |
| 2009/0215512 A1 | 8/2009 | Gannon | |
| 2010/0017890 A1 | 1/2010 | Tucker | |
| 2010/0029380 A1* | 2/2010 | Rhoads | A63F 13/10 463/29 |
| 2010/0062819 A1* | 3/2010 | Hannigan | G06Q 30/02 463/9 |
| 2011/0014982 A1* | 1/2011 | Hiraishi | A63F 13/04 463/36 |
| 2011/0045893 A1 | 2/2011 | Hiraro | |
| 2011/0305367 A1* | 12/2011 | Osako | G06K 9/3216 382/103 |
| 2012/0205436 A1* | 8/2012 | Thomas | G06K 17/0025 235/375 |
| 2012/0244939 A1* | 9/2012 | Braun | G06K 9/228 463/31 |
| 2012/0252577 A1 | 10/2012 | Webster | |
| 2013/0073435 A1* | 3/2013 | Yankovich | G06Q 30/06 705/27.2 |
| 2013/0207373 A1* | 8/2013 | Lucas-Woodley | G06T 11/00 281/15.1 |
| 2014/0100025 A1 | 4/2014 | Ackley | |
| 2014/0114630 A1* | 4/2014 | Brave | G06F 17/5009 703/6 |
| 2014/0344725 A1 | 11/2014 | Bates | |
| 2015/0023602 A1* | 1/2015 | Wnuk | G06F 17/30247 382/190 |
| 2015/0102098 A1 | 4/2015 | Adams | |
| 2015/0196832 A1* | 7/2015 | Schroeder | A63F 1/04 463/11 |
| 2015/0228148 A1* | 8/2015 | Barnes | G07F 17/32 463/17 |
| 2015/0348329 A1* | 12/2015 | Carre | G06Q 30/02 345/633 |
| 2016/0191671 A1 | 6/2016 | Dawson | |
| 2016/0287998 A1* | 10/2016 | Kawanabe | G06K 19/0723 |
| 2017/0361233 A1 | 12/2017 | Stirling | |

FOREIGN PATENT DOCUMENTS

| | | |
|---|---|---|
| CA | 2143874 | 6/2000 |
| CA | 2292678 | 7/2005 |
| CA | 2552135 | 7/2013 |
| CN | 1334650 A | 2/2002 |
| CN | 1202652 C | 10/2002 |
| CN | 1141641 C | 3/2004 |
| CN | 1494679 A | 5/2004 |
| CN | 1219384 | 9/2005 |
| CN | 1307544 | 3/2007 |
| CN | 100407675 | 7/2008 |
| CN | 100423016 C | 10/2008 |
| CN | 100557637 | 11/2009 |
| CN | 101001678 B | 5/2010 |
| CN | 101436242 | 12/2010 |
| CN | 101801482 B | 12/2014 |
| EP | 668583 | 8/1995 |
| EP | 0627728 B1 | 9/2000 |
| EP | 0717337 B1 | 8/2001 |
| EP | 1207694 A2 | 5/2002 |
| EP | 0679977 B1 | 10/2002 |
| EP | 0679978 B1 | 3/2003 |
| EP | 0890924 B1 | 9/2003 |
| EP | 1377902 B1 | 8/2004 |
| EP | 0813132 B1 | 1/2005 |
| EP | 1380133 B1 | 3/2005 |
| EP | 1021021 B1 | 9/2005 |
| EP | 0930584 B1 | 10/2005 |
| EP | 0883087 B1 | 8/2007 |
| EP | 1176828 B1 | 10/2007 |
| EP | 2076888 B1 | 7/2015 |
| GB | 2339938 | 10/2002 |
| GB | 2352154 | 7/2003 |
| JP | 3033956 B2 | 4/2000 |
| JP | 3124916 B2 | 1/2001 |
| JP | 3177221 B2 | 6/2001 |
| JP | 2001204973 A | 7/2001 |
| JP | 3199231 B2 | 8/2001 |
| JP | 3210558 B2 | 9/2001 |
| JP | 3275935 | 2/2002 |
| JP | 3361745 | 1/2003 |
| JP | 3368188 B2 | 1/2003 |
| JP | 3470955 B | 9/2003 |
| JP | 3503774 | 12/2003 |
| JP | 3575598 | 7/2004 |
| JP | 3579823 B | 7/2004 |
| JP | 3579154 B2 | 10/2004 |
| JP | 3701773 B2 | 10/2005 |
| JP | 3777161 | 3/2006 |
| JP | 3914430 B | 2/2007 |
| JP | 3942090 B | 4/2007 |
| JP | 3962361 | 5/2007 |
| JP | 4009235 B | 9/2007 |
| JP | 4225376 | 12/2008 |
| JP | 4653075 | 12/2010 |
| JP | 5063698 B | 8/2012 |
| JP | 5159375 B2 | 3/2013 |
| JP | 5352200 B2 | 11/2013 |
| JP | 5734566 B2 | 6/2015 |
| KR | 20020038229 A | 5/2002 |
| KR | 20030039019 A | 5/2003 |
| MY | 117864 A | 8/2004 |
| SG | 55396 | 12/1998 |
| TW | 424213 | 3/2001 |
| TW | 527825 | 4/2003 |
| TW | 200836091 | 9/2008 |
| TW | 200937926 | 9/2009 |
| TW | 201002013 | 1/2010 |
| TW | 201009746 | 3/2010 |
| TW | 201024997 | 7/2010 |
| TW | 201028871 | 8/2010 |
| WO | 0203645 A2 | 1/2002 |
| WO | 2002073457 | 9/2002 |
| WO | 20020087156 | 10/2002 |
| WO | 03049459 A1 | 6/2003 |
| WO | 03058518 A2 | 7/2003 |
| WO | 2004086212 | 10/2004 |
| WO | 2005079538 | 9/2005 |

(56) References Cited

FOREIGN PATENT DOCUMENTS

| WO | 2007101785    | 9/2007 |
| WO | 2008037599    | 4/2008 |
| WO | 2008074627    | 6/2008 |
| WO | 2008095767    | 8/2008 |
| WO | 2009037257    | 3/2009 |
| WO | 2009104564    | 8/2009 |
| WO | 2010096738 A1 | 8/2010 |

OTHER PUBLICATIONS

Supplementary European Search from the European Patent Office for EP05723458.5, dated Jul. 19, 2010.
International Search Report as Published as WO2005/079538 in corresponding international application No. PCT/US2005/005550. dated Jul. 5, 2006.
Notice of Allowance dated May 24, 2018 for U.S. Appl. No. 14/883,171 (pp. 1-7).
Office Action dated Jun. 5, 2018 for U.S. Appl. No. 14/883,154 (pp. 1-20).

* cited by examiner

SYSTEM AND METHOD FOR UNIQUELY IDENTIFYING PHYSICAL TRADING CARDS AND INCORPORATING TRADING CARD GAME ITEMS IN A VIDEO GAME

CROSS-REFERENCE TO RELATED APPLICATIONS

This application claims priority to U.S. Provisional Patent Application Ser. No. 62/175,904, filed Jun. 15, 2015, the content of which is hereby incorporated by reference herein in its entirety.

This application is additionally related to the following, co-pending U.S. utility patent applications, filed on even date herewith: (1) U.S. patent application Ser. No. 14/883,154, and (2) U.S. patent application Ser. No. 14/883,171, each of which is hereby incorporated by reference herein in its entirety.

FIELD OF THE INVENTION

The invention relates generally to video games, and more particularly to a system and method for uniquely identifying physical trading cards, and for incorporating game items from identified trading cards in a video game.

BACKGROUND OF THE INVENTION

Various video games exist wherein game features and functionality are "unlocked" (or otherwise accessed) via visible codes obtained from physical trading cards distributed for use with the video game.

For example, trading cards may depict a game item (e.g., a character, accessory, etc.) along with an access code (e.g., a serial number or other code) that a user must input in order to activate the game item for use and enjoyment during gameplay. In some instances, the access code may comprise a string of numbers and/or letters that have to be manually entered by the user. Other games, by contrast, encode access codes or other identifiers in bar codes (including QR codes, etc.) that must be scanned in order to extract the code and activate the game item. In either instance, the presence of numbers/letters and/or bar codes on the surface of a trading card may diminish the aesthetic appearance of the trading card.

Further, in conventional trading card printing processes, access codes and identifiers are generally imprinted separately from the trading card's art or content, and thus require a multi-stage printing process. These and other drawbacks exist.

SUMMARY OF THE INVENTION

The invention addressing these and other drawbacks relates to a system and method for uniquely identifying physical trading cards, and for incorporating game items from identified trading cards in a video game.

According to an aspect of the invention, one or more physical trading cards may be created for use with any type of video game. Each trading card may depict at least one game item that may be "unlocked," activated, or otherwise made available for use by a player during gameplay. Non-limiting examples of game items may include, without limitation, virtual trading cards (i.e., virtual representations of a trading card used within a video game), video game characters, in-game accessories for use by a character (e.g., weapons, spells, portions, vehicles, etc.), special powers (e.g., invisibility, a flying ability, characteristic/ability upgrades, etc.) available to a character in the game, or other game items.

In an implementation, graphical representations of unique codes that identify trading cards may be generated, and utilized to generate the trading cards such that the graphical representations of the unique codes are included as aspects of the trading cards.

For example, a graphical representation of a unique code that identifies a trading card may comprise one or more of:

(1) a border of the trading card (or portions thereof) that is to be depicted on the trading card;

(2) background items to be depicted on the trading card (e.g., scenery items or other items depicted in the background of the trading card);

(3) a video game character (or aspects thereof) that is to be depicted on the trading card;

(4) an in-game accessory (or aspects thereof) that is to be depicted on the trading card;

(5) a power (or aspects thereof) that is to be depicted on the trading card;

(6) a watermark embedded into the trading card; or (7) other aspects of the trading card.

According to an aspect of the invention, a plurality of versions of trading cards may exist. Each trading card version may, for example, correspond to one or more of a different set of unique codes for identifying trading cards, a different graphic coding scheme for generating graphical representations of the unique codes, a different graphic coding scheme for generating graphical representations of error detection codes associated with the unique codes, a different version icon, a different template, etc.

Accordingly, in one implementation, versioning information associated with one or more trading cards may be obtained, and the trading cards may be generated based on the versioning information. The versioning information may indicate a version to which a trading card corresponds. Additionally, or alternatively, the versioning information may indicate one or more of a set of unique codes that are to be used to identify trading cards of a particular version, a graphical coding scheme that is to be used for generating graphical representations of the unique codes, a graphical coding scheme that is to be used for generating graphical representations of error detection codes associated with the unique codes, one or more version icons that are to be depicted on the trading cards, a template for the trading cards (e.g., a template that indicates locations at which to place various items on the trading cards, formatting for the trading cards, etc.), or other information.

As an example, one or more version icons that correspond to a version associated with a trading card may be obtained, and the trading card may be generated such that the trading card comprises the obtained version icons (e.g., by obtaining a template comprising the version icons and generating the trading card using a template).

According to an aspect of the invention, one or more portions of a trading card that is to be printed may be provided to a printing system (e.g., a printing service, a printing server, a printer, etc.). Upon receipt of the trading card portions, the printing system may print the trading card to produce a physical copy of the trading card.

In an implementation, information relating to a first portion of the trading card (that is a portion unique to the trading card with respect to a set of trading cards) may be provided to a printing system at a first time, and information relating to a second portion of the trading card (that is a portion common to the set of trading cards) may be provided to the printing system at a second time. Information relating to one or more other portions of the trading card (e.g., another portion that is unique to the trading card, another portion that is common to the set of trading cards, etc.) may also be provided to the printing system at one or more other times. The printing system may then use the information relating to a particular portion of the trading card to determine the contents of that portion of the trading card.

In another implementation, information relating to one or more portions of one or more other trading cards of the set of trading cards may be provided to the printing system, where each of the portions of the other trading cards are respectively unique to one of the other trading cards. Because information relating to one or more common portions (e.g., that are common to the set of trading cards such as the second portion of the trading card) have already been provided to the printing system, these common portions (or related information thereof) need not necessarily be provided again to the printing system (e.g., if the common portions remain stored at the printing system and can be identified for printing the set of trading cards). In this regard, printing delays associated with sending portions of trading cards (common to all trading cards) to a printing system may be mitigated. Additionally, or alternatively, the bandwidth utilization and memory consumption of a printer or printer server associated with sending portions of trading cards to the printing system may be reduced.

According to an aspect of the invention, one or more input streams (e.g., comprising images, videos, etc.) may be scanned for trading card candidates and/or control item candidates thereof (e.g., version icon candidates or other control items), and, upon detection of a trading card candidate and/or its control item candidates, the trading card candidate and/or its control item candidates may be processed to determine whether the trading card candidate is a valid trading card. Upon identifying a valid trading card, the trading card may be utilized to activate one or more benefits associated with the trading in a game.

In an implementation, one or more input streams may be received from a user device, and processed to detect one or more trading card candidates (e.g., items within the input streams that could potentially be valid trading cards).

In an implementation, upon detecting a trading card candidate, one or more control item candidates on the trading card candidate may be detected. Based on the control item candidates, a determination of whether and/or how further processing of the trading card candidate is to be performed may be effectuated. As an example, the relative location(s) of control items on trading cards may be known. As such, the known relative locations on the trading card candidate may be targeted to detect the control item candidates. The detected control item candidates may be compared against one or more known control items associated with one or more sets of trading cards to determine whether the trading card candidate corresponds to one of the sets of trading cards. If it is determined that the trading card candidates corresponds to a set of trading cards, the trading card candidate may then be further processed to determine whether the trading card candidate is a valid one of the trading cards of the set of trading cards (and, if so, which one of the trading cards) (e.g., by checking to see if the trading card candidate comprises a graphical representation of a valid unique code).

In an implementation, one or more version icons depicted on a trading card may be utilized to validate the trading card. As an example, a version icon may correspond to a version identifier associated with a version of trading cards, where a set of trading cards belonging to the same version is associated with a set of unique codes that are to be used for identifying the trading cards of the set of trading cards. As such, upon detecting the version icon of the trading card, the version icon may be utilized to determine the corresponding version identifier. The version identifier may then be utilized to determine the set of unique codes against which a unique code of the trading card (e.g., that is graphically represented on the trading card) may be queried or compared. Upon detecting the graphical representation of the unique code of the trading card, the graphical representation of the unique code may be processed based on a graphic coding scheme (e.g., a graphic decoding scheme that corresponds to the version of the trading card) to obtain the unique code. Once obtained, a determination of whether the unique code of the trading card is one of the valid unique codes (e.g., one of the unique codes in a set of unique codes that corresponds to the version of the trading card) may be effectuated. If the obtained unique code is one of the valid unique codes, an indication that the trading card is valid may be provided.

Although implementations of the invention are described herein with reference to trading cards, it should be appreciated that other objects may be used in place of trading cards in other implementations. For example, other objects that may be used in place of trading cards may include, without limitation, figurines (e.g., action figures or other figurines), figurine accessories, real-world items that correspond to game items, or other objects. As an example, a graphical representation of a unique code for identifying a figurine or figurine accessory may be generated, and used to print all or a portion of the figurine or figurine accessory (e.g., via a 3D printing system) such that the printed figurine or figurine accessory comprises the graphical representation of the unique code.

As a further example, the figurine or figurine accessory may correspond to a game item (e.g., a corresponding character or character accessory in a game), and a user may "unlock," activate, or otherwise access the game item so that it is available for use by the user during gameplay in the game. In one use case, for instance, a scanner, or other input device associated with a user device may be used to capture an input scene comprising the figurine or figurine accessory (or other objects).

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise. In addition, as used in the specification and the claims, the term "or" means "and/or" unless the context clearly dictates otherwise.

DETAILED DESCRIPTION OF THE INVENTION

The invention described herein relates to a system and method for uniquely identifying physical trading cards, and for incorporating game items from identified trading cards in a video game.

Exemplary System Architecture

Figure 1:
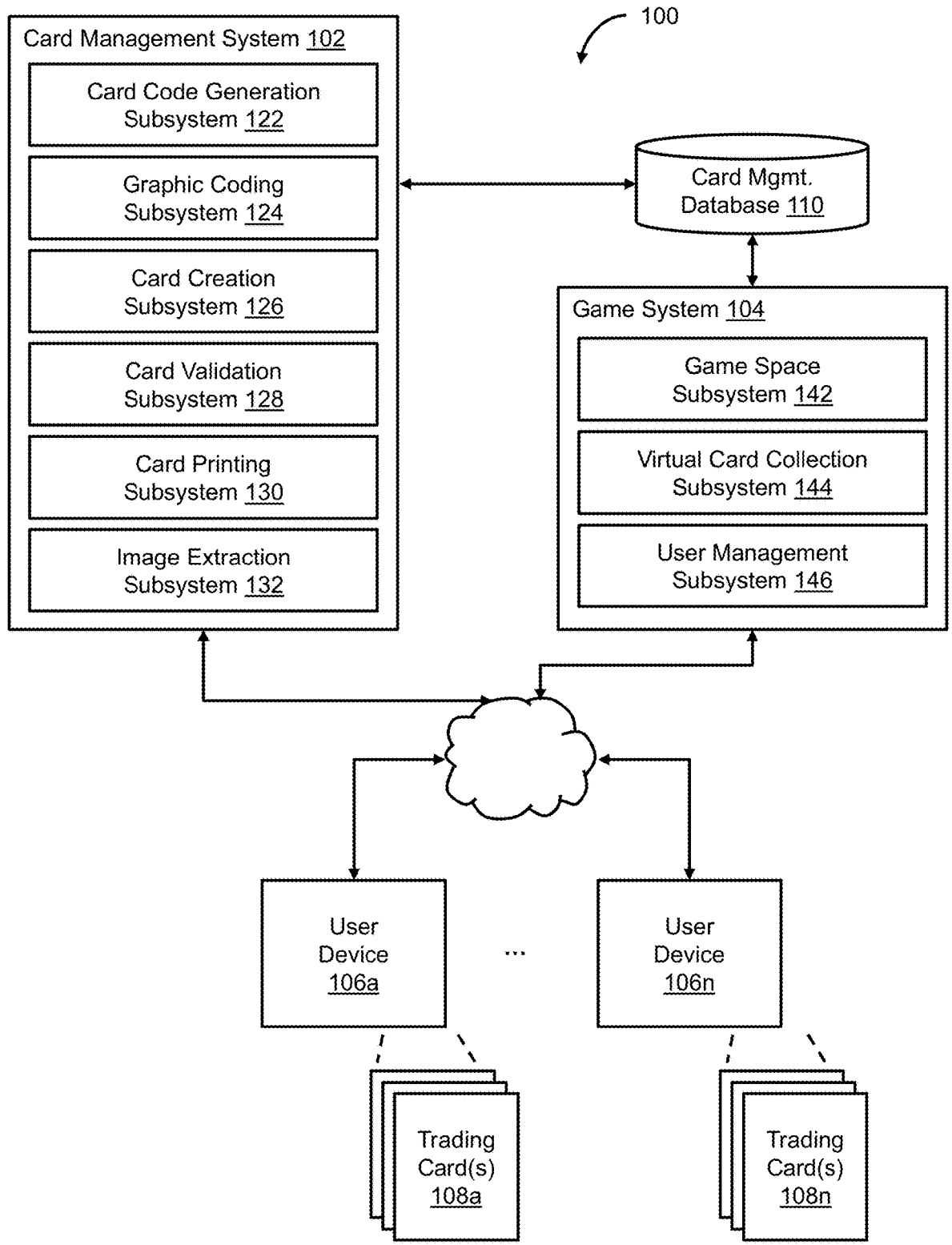
FIG. 1 illustrates an exemplary system for uniquely identifying physical trading cards, and for incorporating game items from identified trading cards in a video game, according to an implementation of the invention.

FIG. 1 illustrates an exemplary system 100 for uniquely identifying physical trading cards, and for incorporating game items from identified trading cards in a video game, according to an implementation of the invention.

As shown, system 100 may comprise a card management system 102, a game system 104, one or more user devices 106, one or more trading cards 108, a card management database 110, or other components.

Card Management System 102

Card management system 102 may comprise one or more servers that include one or more of a card code generation subsystem 122, a graphic coding subsystem 124, a card creation subsystem 126, a card validation subsystem 128, a card printing subsystem 130, an image extraction subsystem 132, or other components.

Game System 104

Game system 104 may comprise one or more servers that include one or more of a game space subsystem 142, a virtual card collection subsystem 144, a user management subsystem 146, or other components.

In one implementation, game system 104 may comprise a proprietary gameplay network system, such as, without limitation, Microsoft's Xbox LIVE®, Sony's PlayStation Network®, gameplay networks provided by Apple, Google, and Amazon, and/or another type of gameplay network system. In this implementation, a given game system 104 may be associated with a particular type of gaming console. Other types of game systems 104 using other types of gameplay networks may be used as well.

User Devices 106a-106n

User device 106 may comprise any type of mobile terminal, fixed terminal, or other device. As an example, user device 106 may comprise a gaming console, a handheld gaming device, a personal computer (e.g., a desktop computer, a laptop computer, etc.), a smartphone, a tablet computing device, and/or other device that can be used to interact with an instance of a video game. Users may, for instance, utilize one or more user devices 106 to interact with card management system 102, game system 104, or other components of system 100.

User device 106 may additionally include a camera, a scanner, or other input device that may be used to capture an input scene (e.g., one or more trading cards or other items). User device 106 may further include a virtual reality or augmented reality device that may be used to capture an input scene and further augment the input scene with computer-generator sensory input.

Trading Cards 108a-108n

According to an aspect of the invention, trading card 108 may comprise a physical card (e.g., made out of paperboard, thick paper, plastic, metal, or other materials) that corresponds to one or more game items. Non-limiting examples of game items include, for instance, virtual trading cards (e.g., virtual representations of a trading card used within a video game), video game characters, in-game accessories for use by a character (e.g., weapons, spells, portions, vehicles, etc.), special powers (e.g., invisibility, a flying ability, characteristic/ability upgrades, etc.) available to a character in the game, or other game items. Other types of trading cards may be used as well.

It should be noted that, although implementations described herein are with respect to trading cards, it is understood that (to the extent possible) other objects may be used in place of trading cards in other implementations. Non-limiting examples of other objects that may be used in place of trading cards include, for instance, figurines (e.g., action figures or other figurines), figurine accessories, real-world items that correspond to game items, or other objects.

Card Management Database 110

According to an aspect of the invention, card management database 110 may be, include, or interface to, for example, one or more of an Oracle™ relational database sold commercially by Oracle Corporation. Other databases, such as Informix™, DB2 (Database 2), NoSQL databases including Hadoop™ or Cassandra™, or other data storage, including file-based, or query formats, platforms, or resources such as OLAP (On Line Analytical Processing), SQL (Structured Query Language), a SAN (storage area network), Microsoft Access™, or others may also be used, incorporated, or accessed. Card management database 110 may comprise one or more such databases that reside in one or more physical devices and in one or more physical locations. The database may store a plurality of types of data and/or files and associated data or file descriptions, administrative information, or any other data.

General System Configuration

It should be noted that while one or more operations are described herein as being performed by components of card management system 102 or game system 104, those operations may, in some implementations, be performed by components of user device 106.

In some implementations, the various computers and subsystems illustrated in FIG. 1 may comprise one or more computing devices that are programmed to perform the functions described herein. The computing devices may include one or more electronic storages (e.g., card management database 110 or other electric storages), one or more physical processors programmed with one or more computer program instructions, and/or other components. The computing devices may include communication lines, or ports to enable the exchange of information with a network or other computing platforms. The computing devices may include a plurality of hardware, software, and/or firmware components operating together to provide the functionality attributed herein to the servers. For example, the computing devices may be implemented by a cloud of computing platforms operating together as the computing devices.

The electronic storages may comprise non-transitory storage media that electronically stores information. The electronic storage media of the electronic storages may include one or both of system storage that is provided integrally (e.g., substantially non-removable) with the servers, or removable storage that is removably connectable to the servers via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storage may store software algorithms, information determined by the processors, information received from the servers, information received from client computing platforms, or other information that enables the servers to function as described herein.

The processors may be programmed to provide information processing capabilities in the servers. As such, the processors may include one or more of a digital processor, an analog processor, a digital circuit designed to process information, an analog circuit designed to process information, a state machine, and/or other mechanisms for electronically processing information. In some implementations, the processors may include a plurality of processing units. These processing units may be physically located within the same device, or the processors may represent processing functionality of a plurality of devices operating in coordination. The processors may be programmed to execute computer program instructions to perform functions described herein of subsystems 122-132, 142-146, or other subsystems. The processors may be programmed to execute computer program instructions by software; hardware; firmware; some combination of software, hardware, or firmware; and/or other mechanisms for configuring processing capabilities on the processors.

It should be appreciated that the description of the functionality provided by the different subsystems 122-132 or 142-146 described herein is for illustrative purposes, and is not intended to be limiting, as any of subsystems 122-132 or 142-146 may provide more or less functionality than is described. For example, one or more of subsystems 122-132 or 142-146 may be eliminated, and some or all of its functionality may be provided by other ones of subsystems 122-132 or 142-146. As another example, additional subsystems may be programmed to perform some or all of the functionality attributed herein to one of subsystems 122-132 or 142-146.

The foregoing system architecture is exemplary only and should not be viewed as limiting. Other system configurations may be used as well, as would be appreciated by those having skill in the art. Attention will now be turned to a more detailed description of various implementations of the invention. It should be noted that features described herein may be implemented separately or in combination with one another.

Card Creation

According to an aspect of the invention, one or more physical trading cards may be created for use with any type of video game (e.g., virtual trading card games, action-adventure games, racing games, first-person-shooter games, and the like). Each trading card may depict at least one game item that may be "unlocked," activated, or otherwise made available for use by a player during gameplay.

As previously noted, examples of game items may include, without limitation, virtual trading cards (i.e., virtual representations of a trading card used within a video game), video game characters, in-game accessories for use by a character (e.g., weapons, spells, portions, vehicles, etc.), special powers (e.g., invisibility, a flying ability, characteristic/ability upgrades, etc.) available to a character in the game, or other game items.

Card Code Generation Subsystem 122

In an implementation, card code generation subsystem 122 may generate one or more unique codes for identifying one or more trading cards. A unique code may comprise a serial number, an alphanumeric code, a set of characters (e.g., numbers, letters, special characters, etc.), or other code or unique identifier.

In one implementation, each trading card may have its own unique code, even if it depicts the same game item as other trading cards. As an example, for a given fantasy game, even though a predetermined number of physical trading cards may be distributed depicting the same "wizard" character, each trading card will have its own unique code.

According to an aspect of the invention, card code generation subsystem 122 may utilize a random number generator (or other algorithm) to generate unique serial numbers for identifying individual trading cards. Each of the unique serial numbers may be randomly selected by the random number generator from numbers within one or more ranges (e.g., default number ranges, user-defined number ranges, etc.). In one use case, the range(s) of numbers (from which the unique serial numbers are randomly selected) may comprise a number space that is significantly greater than the number of unique serial numbers to be generated for identifying the trading cards (e.g., the number space utilized by the random number generated may be significantly greater than the predefined number of trading cards that are to be printed and/or distributed to consumers). In this regard, users cannot easily guess the unique serial numbers (or other unique codes) associated with the trading cards. While the foregoing example describes the use of a random number generator to generate unique serial numbers, any type of algorithm or numbering system may be used for the generation of unique serial numbers. Other techniques for preventing successful reverse engineering of the unique serial numbers are described elsewhere herein.

Graphic Coding Subsystem 124

Upon generation of one or more unique codes, graphic coding subsystem 124 may generate one or more graphic representations of the unique codes based on a graphic coding scheme (e.g., a graphic encoding scheme).

Card Creation Subsystem 126

Card creation subsystem 126 may utilize the graphical representations of the unique codes to generate the trading cards associated with the unique codes. The trading cards may be generated such that the graphical representations of the unique codes are included as aspects of the trading cards.

For example, a graphical representation of a unique code that identifies a trading card may comprise one or more of:

(1) a border of the trading card (or portions thereof) that is to be depicted on the trading card;

(2) background items to be depicted on the trading card (e.g., scenery items or other items depicted in the background of the trading card);

(3) a video game character (or aspects thereof) that is to be depicted on the trading card;

(4) an in-game accessory (or aspects thereof) that is to be depicted on the trading card;

(5) a power (or aspects thereof) that is to be depicted on the trading card;

(6) a watermark embedded into the trading card; or (7) other aspects of the trading card.

In an implementation, card creation subsystem 126 may generate an error detection code (e.g., a cyclic redundancy check (CRC) code, a cryptographic hash, etc.) associated with a unique code of a trading card. Card creation subsystem 126 may then generate a graphic representation of the error detection code based on a graphic coding scheme (e.g., a graphical encoding scheme), and utilize the graphical representation of the error detection code to generate the trading card.

The trading card may be generated such that the graphical representation of the error detection code is included as an aspect of the trading card (e.g., along with the unique code of the trading card). A graphical representation of an error detection code associated with a unique code of a trading card may comprise one or more of:

(1) a border of the trading card (or portions thereof) that is to be depicted on the trading card;

(2) background items to be depicted on the trading card (e.g., scenery items or other items depicted in the background of the trading card);

(3) a video game character (or aspects thereof) that is to be depicted on the trading card;

(4) an in-game accessory (or aspects thereof) that is to be depicted on the trading card;

(5) a power (or aspects thereof) that is to be depicted on the trading card;

(6) a watermark embedded into the trading card; or (7) other aspects of the trading card.

Figure 2:
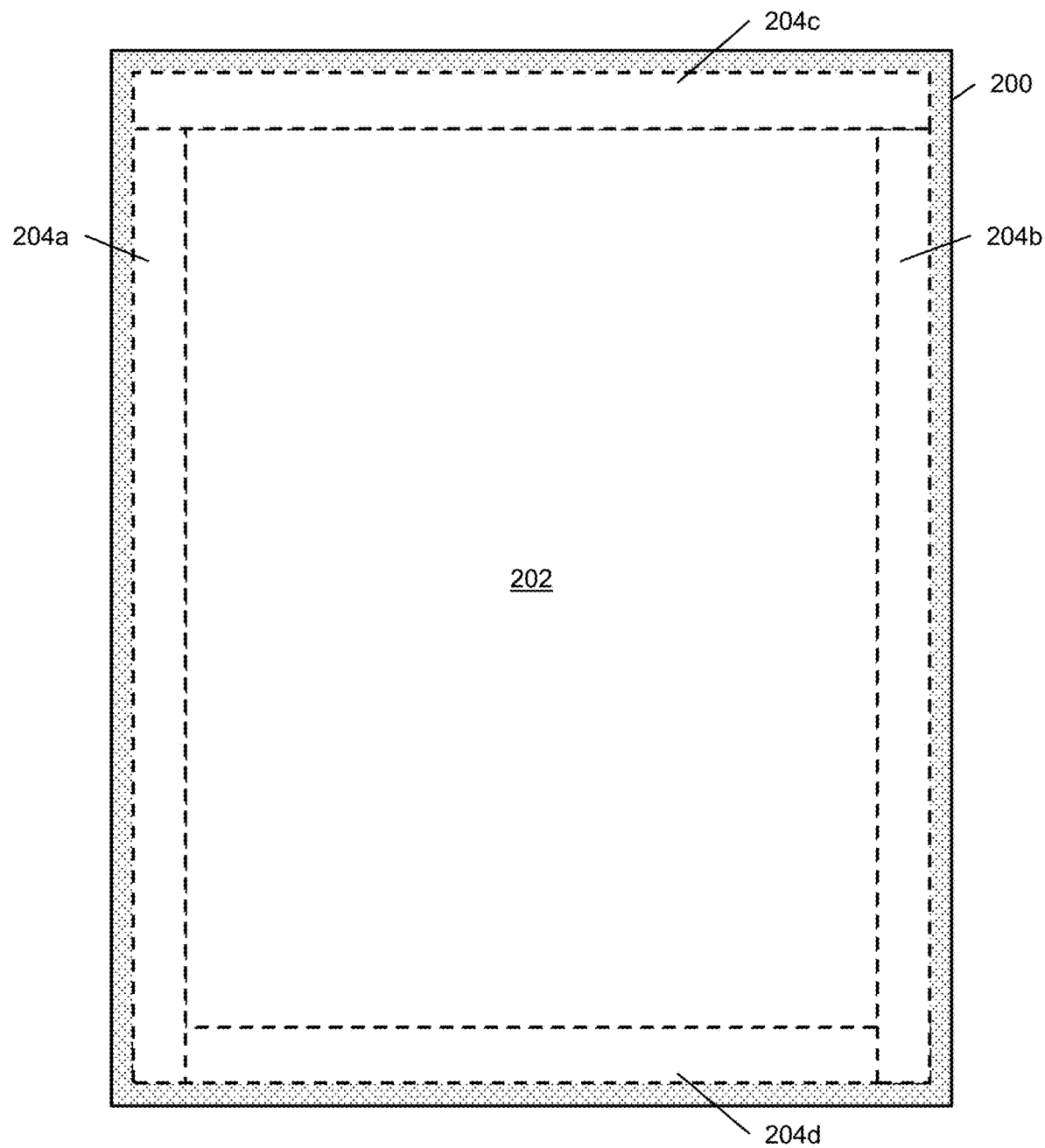
FIG. 2 is an exemplary illustration of a trading card, and of regions of the trading card, according to an implementation of the invention.

As an example, with respect to FIG. 2, a physical trading card 200 may comprise region 202, and regions 204a-204d. Each of regions 202 and 204a-204d may comprise images, text, tactile imprints (e.g., braille transcription), or other aspects of trading card 200. Although regions 202 and 204a-204d are illustrated herein as separate regions, one of skill in the art will appreciate that the regions (or boundaries thereof) may, in some implementations, not be visually separate or distinct from one another (e.g., content in regions 204a-204d may be fully integrated with content in region 202).

In one use case, region 202 may comprise an image of a character of a video game, an in-game accessory for use by a character in the video game, a power available to a character in the video game, or other game item to which trading card 200 corresponds.

Additionally, or alternatively, region 202 may comprise text or tactile imprints that identify or describe a character of a video game, an in-game accessory for use by a character in the video game, a power available to a character in the video game, or other game item to which trading card 200 corresponds.

One or more of regions 204a-204d may comprise one or more portions of a border that surrounds all (or a portion) of region 202.

Figure 3:
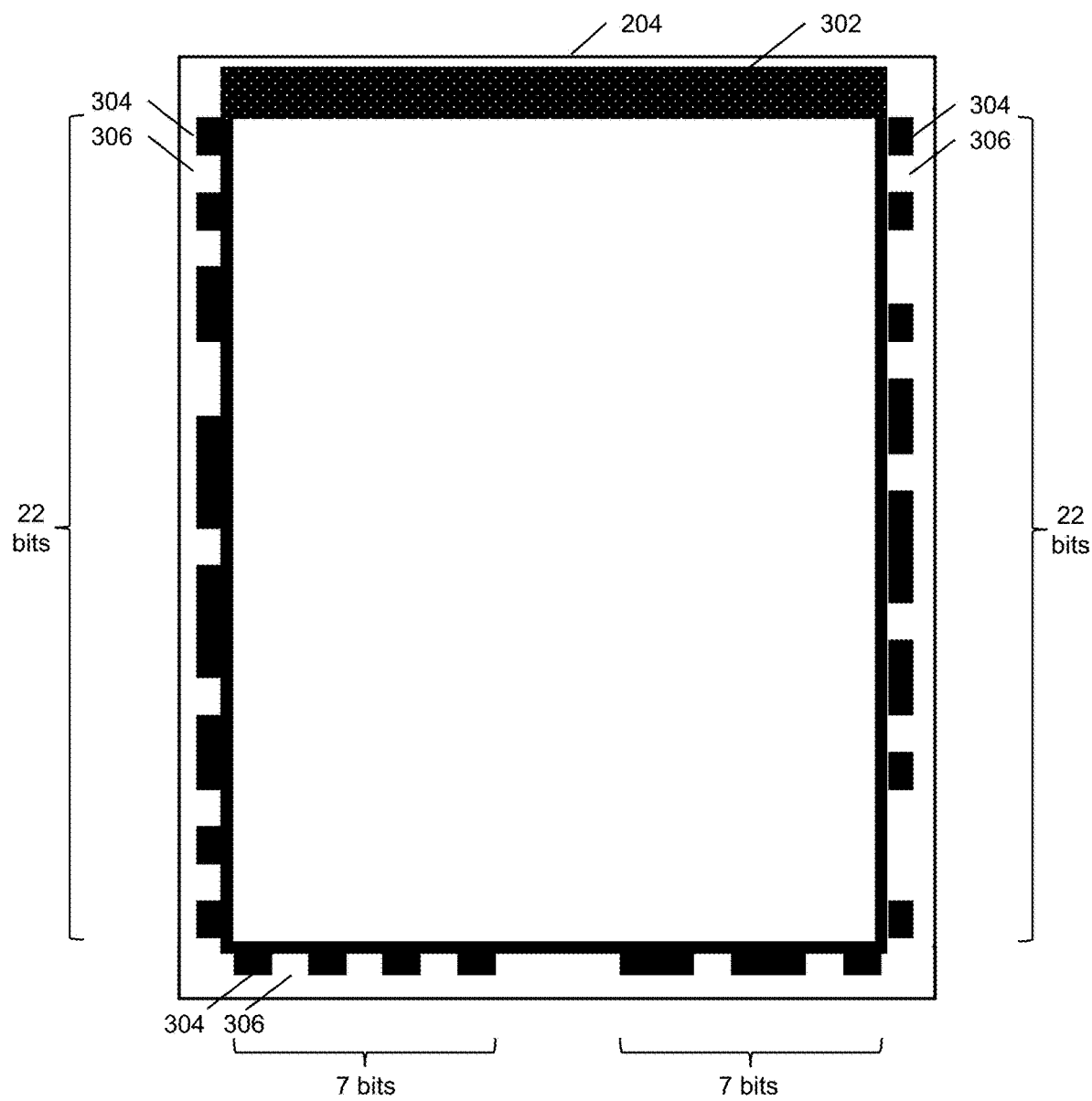
FIG. 3 is an exemplary illustration of a border that includes graphical representations of a unique code of a trading card, an error detection code associated with the unique code, or other aspects of the trading card, according to an implementation of the invention.

With reference to FIG. 3, one or more portions of border 302 depicted within region 204 may comprise a graphical representation of a unique code that identifies trading card 200, as well as a graphical representation of an error detection code generated based on the unique code. The unique code of trading card 200 and/or the error detection code may, for instance, be graphically represented by one or more graphical "on" bits 304 (e.g., a solid block or other graphically-represented bit) and graphical "off" bits 306 (e.g., an empty space, a notch, or other graphically-represented bit).

In one scenario, trading card 200 may comprise two 22-bit arrays of bits 304, 306 positioned vertically (e.g., one on each side of trading card 200), where each 22-bit array represents one half of the unique code of trading card 200. The unique code of trading card 200 may, for example, comprise the 44-bit binary code "10101100111011101101011010010110111011010001," where the left (or first) vertical side array of bits 304, 306 represents the first 22 bits "1010110011101110110101," and the right (or second) vertical side array of bits 304, 306 represents the second 22 bits "1010010110111011010001."

In another scenario, the bits of the unique code of trading card 200 may be randomly distributed along one or more of the top, bottom, or side portions of border 302. The random distribution of the bits may be kept as a "secret" (e.g., stored in card management database 110), and subsequently used to determine the locations of the bits of the unique code to obtain the unique code. Other techniques for representing bits of a unique code on a trading card may of course be utilized.

In yet another scenario, trading card 200 may further comprise two 7-bit arrays of bits 304, 306 positioned horizontally (e.g., from left-to-right along the bottom of trading card 200), where each 7-bit array represents one half of the error detection code associated with the unique code. The error detection code may, for example, comprise the 14-bit binary code "10101011101101," where the bottom-left (or first) array of bits 304, 306 represents the first 7 bits "1010101," and the bottom-right (or second) array of bits 304, 306 represents the second 7 bits of "1101101."

In a further scenario, bits of the error detection code (generated based on the unique code of trading card 200) may be randomly distributed along one or more of the top, bottom, or side portions of border 302. The random distribution of the bits may be kept as a "secret" (e.g., stored in card management database 110), and subsequently used to determine the locations of the bits of the error detection code to obtain the error detection code. Other techniques for representing bits of an error detection code on a trading card may of course be utilized.

Figure 4:
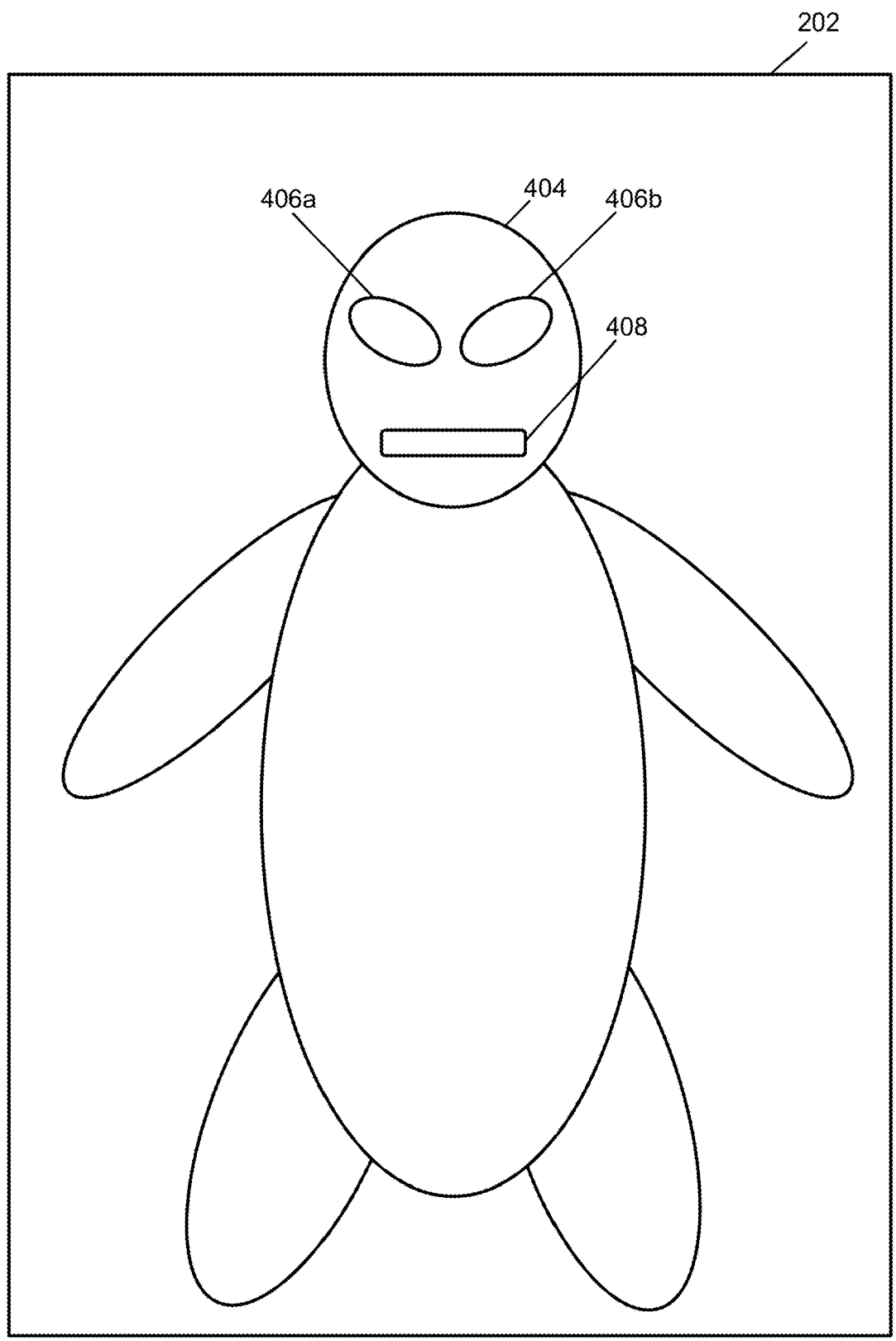
FIG. 4 is an exemplary illustration of a game item (e.g., a character) depicted on a trading card, according to an implementation of the invention.
Figure 5A:
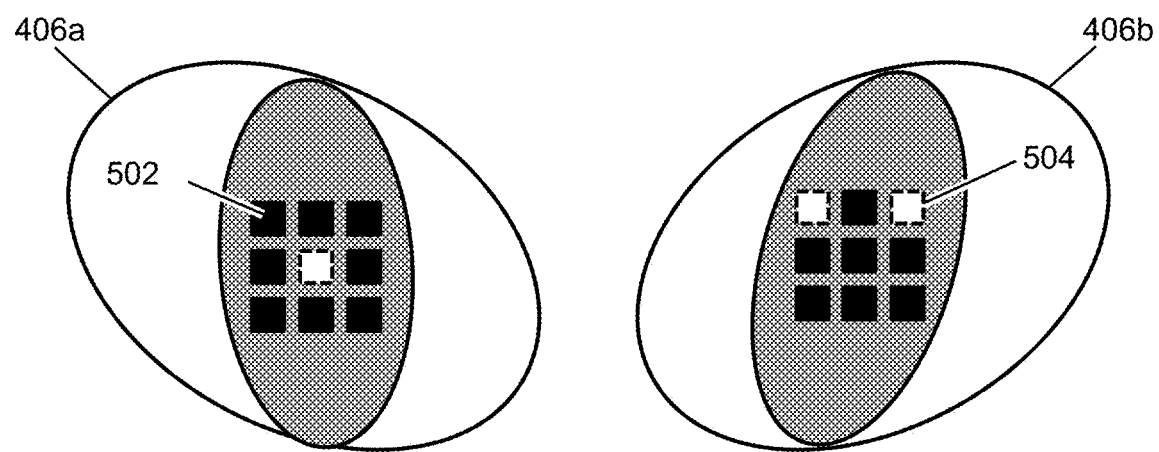
FIGS. 5A-5B are exemplary illustrations of aspects of a character (depicted on a trading card) that include graphical representations of a unique code of a trading card, an error detection code associated with the unique code, or other aspects of the trading card, according to various implementations of the invention.
Figure 5B:
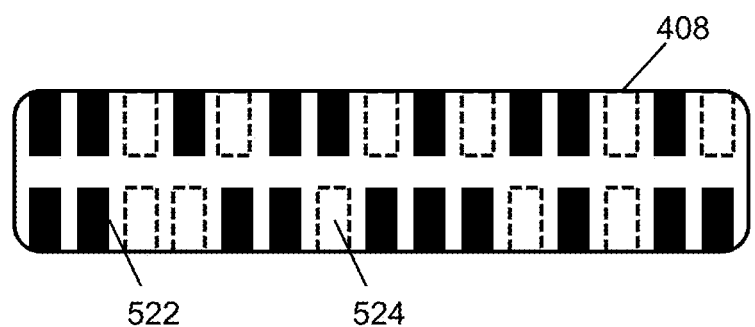

The number of bits and bit arrays of both the unique code and the error detection code, along with the placement of each on trading card 200, may differ in various implementations. For example, with reference to FIG. 4, a game item in the form of video game character 404 is shown within region 202 of trading card 200. Character 404 may comprise a head, a body, two arms, two legs, etc. The head of character 404 may comprise two eyes (406a, 406b), and a mouth 408. With reference to FIGS. 5A-5B, the unique code of trading card 200 or the error detection code may be graphically represented by one or more "on" bits 502, 522 (e.g., a solid block or other graphically-represented bit) and "off" bits 504, 524 (e.g., an empty space, a notch, or other graphically-represented bit).

In one use case, eyes 406a and 406b may each comprise a 9-bit matrix of bits 502, 504 (e.g., that represent the pupils of eyes 406a and 406b), where each 9-bit matrix represents one half of the unique code of trading card 200 or the error detection code associated with the unique code.

In another use case, mouth 408 may comprise two 15-bit arrays of bits 522, 524 (e.g., that represent the teeth of mouth 408), where each 15-bit array represents one half of the unique code of trading card 200 or the error detection code associated with the unique code.

In yet another use case, bits of the unique code of trading card 200 or bits of the error detection code (generated based on the unique code of trading card 200) may be randomly distributed within one or more of the 9-bit matrices (e.g., where each 9-bit matrix represents a pupil of one of the eyes 406a or 406b) or the 15-bit arrays (e.g., where each 15-bit array represents a row of teeth of mouth 408). The random distribution of the bits may be kept as a "secret" (e.g., stored in card management database 110), and subsequently used to determine the locations of the bits of the unique code or the bits of the error detection code to obtain the unique code or the error detection code, respectively. Other techniques for representing bits of a unique code or an error detection code on a trading card may of course be utilized.

Versioning Information

According to an aspect of the invention, a plurality of versions of trading cards may exist. Each trading card version may, for example, correspond to one or more of a different set of unique codes for identifying trading cards, a different graphic coding scheme for generating graphical representations of the unique codes, a different graphic coding scheme for generating graphical representations of error detection codes associated with the unique codes, a different version icon, a different template, etc.

Accordingly, in one implementation, card creation subsystem 126 may obtain versioning information associated with one or more trading cards, and generate the trading cards based on the versioning information. The versioning information may indicate a version to which a trading card corresponds. Additionally, or alternatively, the versioning information may indicate one or more of a set of unique codes that are to be used to identify trading cards of a particular version, a graphical coding scheme that is to be used for generating graphical representations of the unique codes, a graphical coding scheme that is to be used for generating graphical representations of error detection codes associated with the unique codes, one or more version icons that are to be depicted on the trading cards, a template for the trading cards (e.g., a template that indicates locations at which to place various items on the trading cards, formatting for the trading cards, etc.), or other information.

Version Icons

As an example, based on an indication of a version of a trading card (e.g., a version identifier), card creation subsystem 126 may obtain one or more version icons that correspond to the indicated version. Card creation subsystem 126 may generate the trading card such that the trading card comprises the obtained version icons (e.g., by obtaining a template comprising the version icons and generating the trading card using a template).

As a further example, based on the indicated version, card creation subsystem 126 may determine one or more locations on the trading card at which to place the obtained version icons, a graphical representation of a unique code of the trading card, a graphical representation of an error detection code associated with the unique code, or other items.

Figure 6A:
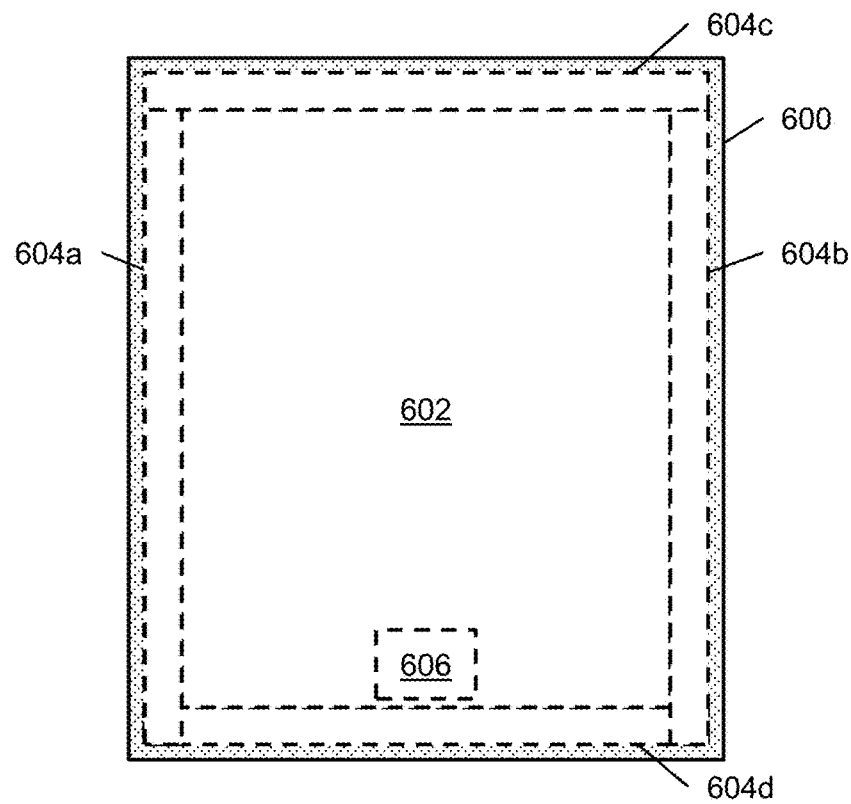
FIGS. 6A-6C are exemplary illustrations of different versions of trading cards, according to various implementations of the invention.

In one scenario, with respect to FIG. 6A, trading card 600 may comprise regions 602, 604a-604d, and 606. Each of regions 602, 604a-604d, and 606 may comprise images, text, tactile imprints, or other aspects of trading card 600. Region 602 may comprise an image of a game item, such as a character of a game, an in-game accessory for use by a character in the game, a power available to a character in the game, or other game item to which trading card 600 corresponds. One or more of regions 604a-604d may comprise one or more portions of a border around all (or a portion of) region 602. Region 606 may comprise a version icon corresponding to a version of trading card 600.

The respective locations at which regions 602, 604a-604d, and 606 are placed on trading card 600 may be based on the version of trading card 600 (e.g., region 606 may be placed at the bottom of region 602 based on the version of trading card 600).

Additionally, or alternatively, the respective locations at which items (e.g., the version icon) are placed within regions 602, 604a-604, and 606 may be based on the version of trading card 600.

Figure 6B:
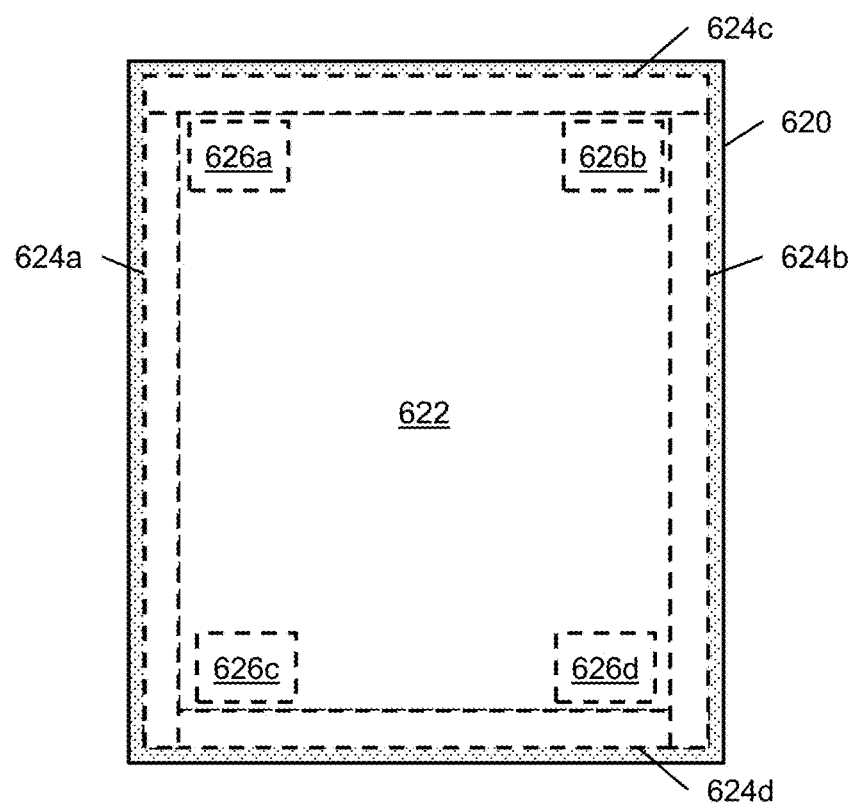

In another scenario, trading card 620 (FIG. 6B) may correspond to a different version than the version of trading card 600 (FIG. 6A). For example, each of regions 622, 624a-624d, and 626a-626d may comprise images, text, tactile imprints, or other aspects of trading card 600. Each of regions 626a-626d may comprise a version icon corresponding to the version of trading card 620, and the locations of regions 626a-626d may be based on the version of trading card 620. The number of regions comprising a version icon and the locations of such regions (e.g., regions 606 and 626a-626d) on the respective trading cards 600 and 620 may be different, for example, because trading cards 600 and 620 respectively correspond to different versions. Additionally, or alternatively, the version icon depicted on trading card 600 may be different than the version icons depicted on trading card 620 (e.g., based on the versions of the trading cards 600 and 620 being different).

Figure 7:
FIG. 7 is an exemplary illustration of a trading card that depicts a border-based graphical representation of a unique code of the trading card, according to an implementation of the invention.

In yet another scenario, with respect to FIG. 7, trading card 700 may comprise a border 702 having graphical "on" bits 704 (e.g., non-notched border portion), graphical "off" bits 706 (e.g., notched border portion), and a version icon 708. Trading card 700 may, for example, be generated based on a template corresponding to a particular trading card version. The corresponding template may comprise version icon 708 or other aspects corresponding to the trading card version (e.g., the template may place version icon 708 and other aspects at predetermined locations). As described elsewhere herein, the version icon may be utilized for validation of trading cards (e.g., to identify a set of unique codes with which to compare a detected unique code, to identify the orientation of a trading card, etc.) or other purposes.

Figure 6C:
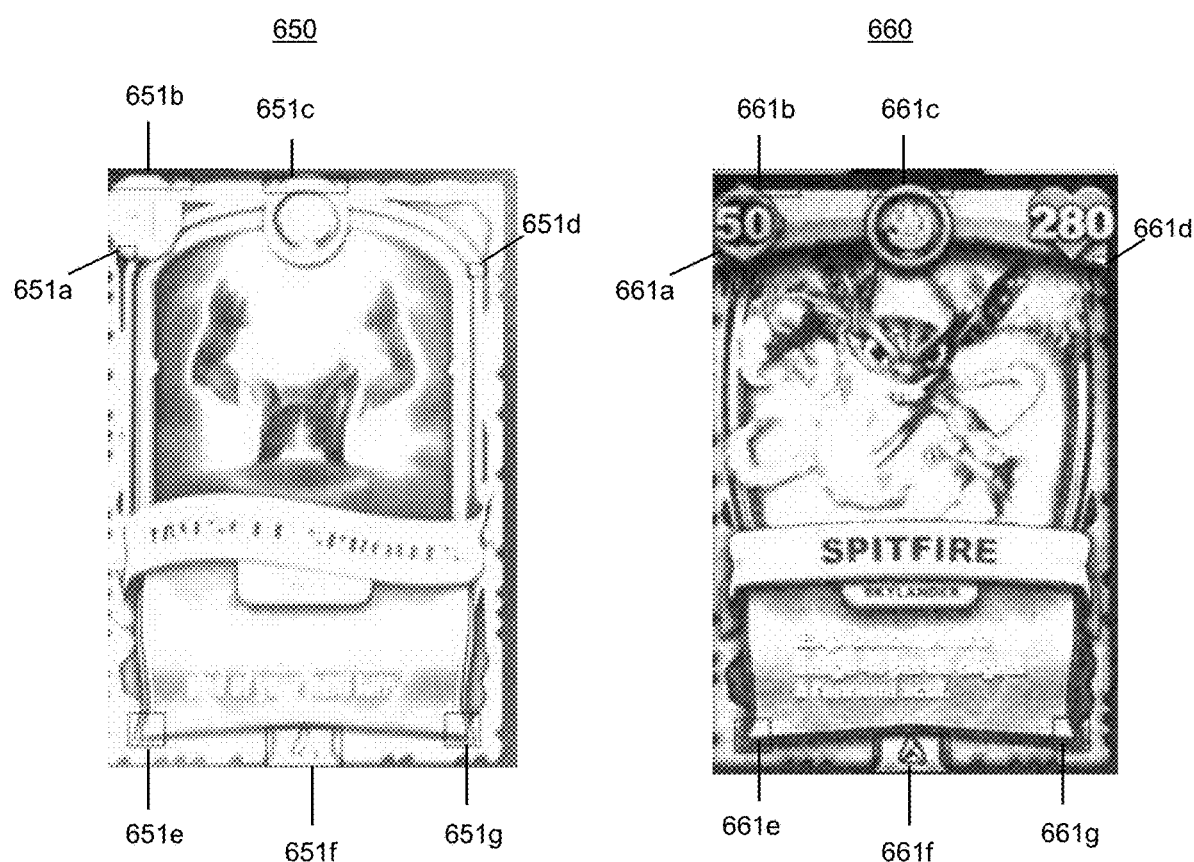

In one implementation, two or more trading cards (e.g., associated with the same version of trading cards, or otherwise affiliated) may be designed to share a predetermined number of common regions or portions (also referred to as "keypoints") to facilitate the detection and validation process (described in additional detail below). In one non-limiting example, with reference to FIG. 6C, a first trading card 650 may depict a first character, and a second trading card 660 may depict a second (different) character. Trading card 650 may comprise, for example, seven keypoints (651*a*, 651*b*, 651*c*, 651*d*, 651*e*, 651*f*, and 651*g*) that correspond identically and respectively, in both position and content, to seven keypoints (661*a*, 661*b*, 661*c*, 661*d*, 661*e*, 661*f*, and 661*g*) on trading card 660. Additional trading cards (not pictured) may likewise include the same seven keypoints, even though each trading card may depict a different character or other game item. A keypoint may comprise any type of content including, without limitation, a color, border, text, graphic, or any other aspect of a trading card. Further, the number of shared keypoints may vary in different implementations, along with their positions on the trading cards. In other words, the position, content, and number of shared keypoints on trading cards 650 and 660 in FIG. 6C are exemplary only, and should not be viewed as limiting.

Pre-Printing and/or Pre-Distribution Card Validation

According to an aspect of the invention, electronic copies of trading cards may be validated prior to printing and/or distributing the trading cards to mitigate the number of defective printed and/or distributed trading cards.

Card Validation Subsystem 128

In an implementation, upon generation of an electronic copy of a trading card, card validation subsystem 128 may validate the electronic copy of the trading card. During validation of the electronic copy of the trading card (e.g., a generated file comprising an image of the trading card), card validation subsystem 128 may detect one or more of a graphical representation of a unique code of the trading card, a graphical representation of an error detection code associated with the unique code, a version icon of the trading card, or other aspects of the trading card. Card validation subsystem 128 may then process the detected aspects of the trading card to determine whether the trading card is a valid trading card ready for printing and/or distribution.

If a trading card is determined to be invalid, card validation subsystem 128 may provide a notification for presentation to one or more users (e.g., administrators or other users) regarding the defect, store information regarding the defect in a log (e.g., in card management database 110), or perform other reporting or remedial measures.

In one use case, upon detecting the version icon of the trading card, validation subsystem 128 may determine a version identifier that corresponds to the version icon. The version identifier may be utilized to determine a set of unique codes against which a unique code of the trading card (e.g., that is graphically represented on the trading card) may be queried or compared. Additionally, or alternatively, the detected version icon may be utilized to determine an orientation of the trading card. For example, if the location of the version icon on the trading card is known, the detected location of the version icon relative to other aspects of the trading card may be utilized to determine the orientation of the trading card. The shape, color, or other aspect of the version icon may additionally or alternatively be utilized to determine the orientation of the trading card (e.g., triangular version icon 708 in FIG. 7 has a point directed toward the top center of trading card 700 and a single side that faces (and is parallel to) the bottom center of trading card 700). In other implementations, a versioning icon may have a color that matches a known portion of a trading card (e.g., a top edge of the trading card) to assist in determining the orientation of the trading card.

In a further use case, upon detecting the graphical representation of the unique code of the trading card, card validation subsystem 128 may process the graphical representation of the unique code based on a graphic coding scheme (e.g., a graphic decoding scheme that corresponds to the version of the trading card) to obtain the unique code. Once obtained, card validation subsystem 128 may determine whether the unique code of the trading card is one of the valid unique codes (e.g., one of the unique codes in a set of unique codes that corresponds to the version of the trading card). If the obtained unique code is one of the valid unique codes, card validation subsystem 128 may provide an indication that the trading card is valid (e.g., providing a notification to a user indicating that the trading card is valid, marking the trading card as valid and ready for printing and/or distribution, etc.).

Printing of Trading Cards

Card Printing Subsystem 130

According to an aspect of the invention, card printing subsystem 130 may facilitate printing of one or more trading cards. As an example, card printing subsystem 130 may provide one or more portions of a trading card that is to be printed to a printing system (e.g., a printing service, one or more print servers, a printer, etc.) that may be part of system 100 (not illustrated), or external to system 100. Upon receipt of the trading card portions, the printing system may print the trading card to produce a physical copy of the trading card.

In an implementation, card printing subsystem 130 may provide information relating to a first portion of a trading card to a printing system at a first time, where the first portion is unique to the trading card with respect to a set of trading cards. Card printing subsystem 130 may provide information relating to a second portion of the trading card to the printing system at a second time, where the second portion of the trading card is common to the set of trading cards. Information relating to one or more other portions of the trading card (e.g., another portion that is common to the set of trading cards, another portion that is unique to the trading card, etc.) may also be provided to the printing system at one or more other times. The printing system may then use the information relating to a particular portion of the trading card to determine the contents of that portion of the trading card.

In another implementation, card printing subsystem 130 may provide information relating to one or more portions of one or more other trading cards of the set of trading cards to the printing system, where each of the portions of the other trading cards are respectively unique to one of the other trading cards. Because information relating to one or more common portions (e.g., that are common to the set of trading cards such as the second portion of the trading card) have already been provided to the printing system, these common portions (or related information thereof) need not necessarily be provided again to the printing system (e.g., if the common portions remain stored at the printing system and can be identified for printing the set of trading cards). In this regard, printing and print processing delays associated with sending portions of trading cards (common to all trading cards) to a printing system may be mitigated. Additionally, or alternatively, the bandwidth utilization associated with sending portions of trading cards to the printing system may be reduced.

As an example, with respect to FIG. 2, region 202 of trading card 200 (and items depicted within region 202) may be common to a set of trading cards (e.g., all trading cards of the set may correspond to a character in a game that is depicted in region 202). Regions 204*a*-204*d* of trading card 200 (and items depicted within region 202) may be unique to trading card 200 such that other corresponding regions of other trading cards in the same set are different than regions 204*a*-204*d* of trading card 200.

Card printing subsystem 130 may transmit a first file (e.g., a PDF file, a PNG file, etc.) of an image that includes region 202 (and does not include one or more of regions 204a-204d) to a printing system, and transmit one or more additional files that includes one or more of regions 204a-204d (e.g., and do not include region 202) to the printing system.

Additionally, or alternatively, card printing subsystem 130 may transmit one or more printing instructions to the printing system for combining the transmitted files to generate a file comprising trading card 200 (e.g., a PDF file, a PNG file, or other file that comprises regions 202 and 204a-204d and other aspects of trading card 200). The printing system may print trading card 200 to produce a physical copy of trading card 200 (e.g., using the printing instructions, the file generated from a combination of the transmitted files, etc.).

Additionally, or alternatively, card printing subsystem 130 may transmit one or more layout instructions to the printing system that instruct the printing system to create the contents of a particular region. For example, card printing subsystem 130 may transmit layout instructions that cause the printing system to create a certain border image to be used in one or more of regions 204a-204d. In some embodiments, the card printing subsystem 130 may comprise a plurality of component images that can be pieced together to form the trading card's unique code in one or more regions 204a-204d. For example, component images may correspond to individual bits of the trading card's unique code, either in a disabled or enabled state. The printing system may use the component images to compose the unique code in one or more regions 204a-204d. In some embodiments, the printing system may be pre-programmed to process layout data into content for one or more regions.

As a further example, with respect to FIG. 2, card printing subsystem 130 may transmit one or more additional files that include regions of other trading cards (in the same set as trading card 200) that are unique to their respective trading cards to the printing system. The regions of the other trading cards that are included in the additional files may, for instance, correspond to regions 204a-204d of trading card 200 (e.g., the corresponding regions and regions 204a-204d may comprise respective borders that graphically represent unique codes of the trading cards, error detection codes of the trading cards, etc.). Because the first file of the image (that includes region 202) has already been transmitted to the printing system, and the image including region 202 is common to trading card 200 and the other trading cards in the set, card printing subsystem 130 need not necessarily transmit the regions of the other trading cards that correspond to region 202 to the printing system. In other words, the already-transmitted image that includes region 202 may be utilized to print the regions of the other trading cards that correspond to region 202 of trading card 200.

As another example, with respect to FIG. 7, an electronic copy of trading card 700 may comprise a combination of layers (e.g., background layer, mask layer, etc.), where one or more of those layers comprise aspects that are common to trading cards in the same set of trading cards as trading card 700 (e.g., same image of a character to which all the trading cards in the set correspond), and one or more other ones of the layers comprise aspects that are unique to trading card 700 (e.g., a graphical representation of a unique code of trading card 700, a graphical representation of an error detection code associated with the unique code, etc.).

Electronic copies of other trading cards in the same set of trading cards may comprise a combination of layers, where one or more of those layers comprise aspects that are common to trading card 700 (and one another), and one or more other ones of the layers comprise aspects that are unique to the respective trading cards. Card printing subsystem 130 may transmit one or more first layers comprising the common aspects to a printing system (e.g., for use in printing trading card 700 or other trading cards in the same set). Card printing subsystem 130 may transmit one or more second layers to the printing system, where each of the second layers comprise one or more aspects that are unique to a respective trading card (e.g., unique to trading card 700, unique to another trading card in the same set, etc.). Additionally, or alternatively, card printing subsystem 130 may transmit one or more printing instructions to the printing system for combining the layers (e.g., placing the layers over one another or using other techniques) to generate electronic copies of the trading cards for printing.

As yet another example, with respect to FIG. 7, card printing subsystem 130 may transmit one or more first layers of trading card 700 (that comprise aspects that are common to other trading cards in the same set of trading cards as trading card 700) to a printing system. To have the printing system print the trading cards in the set with graphical representations of unique codes of the trading cards or error detection codes associated with the unique codes, card printing subsystem 130 may transmit information identifying the unique codes or the error detection codes along with one or more printing instructions (for graphically representing the unique codes or the error detection codes on the trading cards) to the printing system. Additionally, or alternatively, the printing system may be pre-programmed with printing instructions for graphically representing the unique codes or the error detection codes on the trading cards. Upon receipt of the common layers, the unique codes, the error detection codes, or other aspects of the trading cards, the printing system may utilize the received items to print and produce physical copies of the trading cards.

Though the foregoing discussion regarding card printing subsystem 130 discusses providing information relating to various portions of one or more trading cards at varying times, one of ordinary skill will recognize that the information relating to the various portions (including, without limitation, information relating to images, instructions, layout, encodings, component images, layers, or any other discussed portions) may be provided in any sequence and arrangement of files, including at once in a single file.

According to an aspect of the invention, the order and/or arrangement in which trading cards are printed may be defined according to certain parameters. For example, trading cards that are intended to be packaged together may be printed consecutively. Similarly, trading cards that are meant to be distributed in a particular batch (e.g., those relating to a particular geography, version, release wave, or the like) can be arranged to be printed consecutively. Digitally arranging and ordering cards to be printed consecutively may, for example, avoid more complex mechanical arranging and ordering. Digitally arranging and ordering cards may also facilitate the tracking and verification of trading cards. Furthermore, digitally arranging and/or ordering trading cards may allow for non-random card groupings, which can be tuned based on customer feedback and player analytics.

Image Extraction

According to an aspect of the invention, a user (e.g., a game player) that has obtained one or more physical trading cards may desire to "unlock," activate, or otherwise access a game item depicted on a trading card so that it is available for use by the player during gameplay of the video game. Accordingly, a camera, a scanner, or other input device associated with user device 106 may be used to capture an input scene comprising one or more trading cards or other items.

Image Extraction Subsystem 132

In an implementation, image extraction subsystem 132 may receive one or more input streams (e.g., comprising images, videos, etc.) from user device 106. Image extraction subsystem 132 may process the input streams to detect one or more trading card candidates (e.g., items within the input streams that could potentially be valid trading cards).

In one implementation, the one or more input streams may be sampled continuously, at a predetermined interval, or based on changes to a scene (e.g., additional samples may be acquired when the camera focus changes or improves, when a trading card is observed to be oriented at a new angle or otherwise moved, and/or when the camera's zoom levels are changed). The sampling data may then be used to detect one or more trading card candidates and/or unique codes with increased confidence. For example, only data (e.g., bits) present in a predetermined percentage of samples may be deemed as being correctly read (or imaged).

It should be noted that while one or more operations are described herein as being performed by components of card management system 102, those operations may, in some implementations, be performed by components of user device 106. For example, in some implementations, user device 106 may comprise an image extraction subsystem that is similar to, or the same as, image extraction subsystem 132.

According to an aspect of the invention, image extraction subsystem 132 may detect rectangles in the input streams by selecting shapes with appropriate interior angles and height-width ratios, perform perspective correction to obtain "flat" rectangles, or perform other operations to detect the trading card candidates. Additionally, or alternatively, image extraction subsystem 132 may detect predefined reference shapes (e.g., predefined icons, glyphs, symbols, etc.) to detect trading card candidates. For instance, one or more keypoints (such as those described above with reference to FIG. 6C) may be used to detect trading card candidates.

In an implementation, upon detecting a trading card candidate, image extraction subsystem 132 may detect one or more control item candidates on the trading card candidate. Based on the control item candidates, image extraction subsystem 132 may determine whether and/or how further processing of the trading card candidate is to be performed. As an example, the relative location(s) of control items on trading cards may be known (e.g., stored in card management database 110). As such, image extraction subsystem 132 may target the known relative locations on the trading card candidate to detect the control item candidates. The detected control item candidates may be compared against one or more known control items associated with one or more sets of trading cards to determine whether the trading card candidate corresponds to one of the sets of trading cards. If it is determined that the trading card candidates corresponds to a set of trading cards, the trading card candidate may then be further processed (e.g., by card validation subsystem 128) to determine whether the trading card candidate is a valid one of the trading cards of the set of trading cards (and, if so, which one of the trading cards) (e.g., by checking to see if the trading card candidate comprises a graphical representation of a valid unique code).

In one use case, one or more version icons (or other aspects of trading cards) may be used as control items (e.g., if the number of version icons against which version icon candidates are to be compared is "small"). If, for example, the relative location(s) of version icons on trading cards is known, image extraction subsystem 132 may target the known relative locations on a trading card candidate to detect one or more version icon candidates. A detected version icon candidate may be compared against one or more known version icons (that correspond to one or more versions of trading cards) to determine whether the version icon candidate is one of the known version icons. If the version icon candidate is determined to be a particular known version icon that corresponds to a version of trading cards, image extraction subsystem 132 may provide the trading card candidate for further processing to determine whether the trading card candidate is a valid one of the trading cards of the set of trading cards (e.g., by checking to see if the trading card candidate comprises a graphical representation of a valid unique code).

In a further use case, the version icon may be utilized to determine an orientation of the trading card candidate. For example, if the relative location of the version icon on trading cards is known, the detected location of the version icon relative to other aspects of the trading card candidate may be utilized to determine the orientation of the trading card candidate. The shape, color, or other aspect of the version icon may additionally or alternatively be utilized to determine the orientation of the trading card candidate (e.g., triangular version icon 708 has a point directed toward the top center of trading card 700 and a single side that faces the bottom center of trading card 700, a versioning icon may have a color that is closer to a top edge of the trading card and a color that is closer to a bottom edge of the trading card, etc.). The orientation of the trading card candidate may, for example, be utilized to reorient an image of the trading card candidate, and the reoriented image may be provided to card validation subsystem 128 for determining the validity of the trading card candidate.

In one implementation, image extraction subsystem 132 may comprise an troubleshooting mode for providing a user of image extraction subsystem 132 instructions on properly detecting one or more trading cards in a scene. In some embodiments, the troubleshooting mode may provide feedback (e.g., visual, audio, haptic, etc.) when portions of a trading card have been recognized or recognized to within a threshold certainty. In some embodiments, the troubleshooting mode may be presented to the user after a predefined number of failed attempts to recognize a trading card. Additionally or alternatively, the user may manually enable the troubleshooting mode.

Post-Printing and/or Post-Distribution Card Validation

In an implementation, card validation subsystem 128 may receive one or more trading cards (e.g., images of one or more trading card candidates from image extraction subsystem 132), and process the trading cards to determine whether the trading cards are valid and/or to identify the trading cards (e.g., by identifying their respective unique codes). As an example, upon receipt of a trading card, card validation subsystem 128 may detect one or more of a graphical representation of a unique code of the trading card, a graphical representation of an error detection code associated with the unique code, a version icon of the trading card, or other aspects of the trading card. Card validation subsystem 128 may then process the detected aspects of the trading card to determine whether the trading card is a valid trading card, and, if valid, to identify the trading card (e.g., by identifying its unique code).

In an implementation, one or more version icons depicted on a trading card may be utilized to validate the trading card. As an example, a version icon may correspond to a version identifier associated with a version of trading cards, where a set of trading cards belonging to the same version is associated with a set of unique codes that are to be used for identifying the trading cards of the set of trading cards. As such, upon detecting the version icon of the trading card, card validation subsystem 128 may utilize the version icon to determine the corresponding version identifier. Card validation subsystem 128 may then utilize the version identifier to determine the set of unique codes against which a unique code of the trading card (e.g., that is graphically represented on the trading card) may be queried or compared. Upon detecting the graphical representation of the unique code of the trading card, card validation subsystem 128 may process the graphical representation of the unique code based on a graphic coding scheme (e.g., a graphic decoding scheme that corresponds to the version of the trading card) to obtain the unique code. Once obtained, card validation subsystem 128 may determine whether the unique code of the trading card is one of the valid unique codes (e.g., one of the unique codes in a set of unique codes that corresponds to the version of the trading card). If the obtained unique code is one of the valid unique codes, card validation subsystem 128 may provide an indication that the trading card is valid.

As another example, a graphical coding scheme (e.g., a graphic encoding scheme, a graphic decoding scheme, etc.) may be associated with a version of trading cards (or a version identifier thereof). Upon detecting the version icon of the trading card, card validation subsystem 128 may utilize the version icon to determine the corresponding version identifier. Card validation subsystem 128 may then utilize the version identifier to determine the graphic coding scheme for decoding a graphical representation of a unique code of the trading card, and obtain the unique code based on the graphic coding scheme. Once obtained, card validation subsystem 128 may determine whether the unique code of the trading card is one of the valid unique codes (e.g., one of the unique codes in a set of unique codes that corresponds to the version of the trading card). If the obtained unique code is one of the valid unique codes, card validation subsystem 128 may provide an indication that the trading card is valid.

As indicated, in some implementations, multiple versions of trading cards may exist, and individual ones of the multiple versions may each have its own version icon(s) (or other version indicator) that represents the respective version of trading cards. In an implementation, each version of trading cards may be associated with a set of unique codes, where each of the unique codes of the same set is unique with respect to one another, but not necessarily unique with respect to other sets of unique codes. In this way, the use of multiple versions may allow for a large (if not unlimited) unique code space. In another implementation, each version of trading cards may be associated with a graphic coding algorithm (e.g., comprising a graphic coding scheme) for encoding codes (e.g., unique codes, error detection codes, etc.), decoding graphical representations of codes (e.g., unique codes, error detection codes, etc.), etc. As such, for example, the use of the version icon may allow for algorithmic improvements or other modifications to the encoding or decoding processes, backward compatibility for older versions of trading cards, or other benefits.

In an implementation, a unique code of a trading card may comprise one or more control bits (e.g., registration bits or other control bits). As an example, the control bits may be utilized for determining the locations of other bits of the unique code (e.g., the payload) that are represented on the trading card. In one use case, with respect to FIG. 3, trading card 200 may comprise two side 22-bit arrays of bits 304 and 306, where each 22-bit array represents one half of the unique code of trading card 200. The unique code of trading card 200 may, for example, comprise the 44-bit binary code "10101100111011101101011010010110111011010001," where the left side array of bits 304 and 306 represents the first 22 bits "1010110011101110110101," and the right side array of bits 304 and 306 represents the second 22 bits "1010010110111011010001." The control bits may comprise the first and last bit of each 22-bit array (e.g., set as "1"), while the remaining bits constitute the payload. When graphically represented, for example, the predefined control bits may be utilized to form a grid (e.g., the top most and bottom most bits of the unique code represented on the left side array and right side array, respectively, may be utilized as the corner points of the grid). Based on the grid, card validation subsystem 128 may extract the graphical representation of the unique code from the trading card.

Of course, the foregoing arrangement of bits and the number of bits (e.g., that represent a unique code or a portion thereof) are merely exemplary. As an example, the bits of a unique code may be arranged in any fashion on the trading card, including in arrays on any number of sides of the trading card. The number of bits representing a unique code may be modified to accommodate a larger or smaller number space (e.g., on which the unique code may be based). In another embodiment, the unique code may, for example, comprise two 24-bit arrays, each array containing two control bits.

In an implementation, an error detection code represented on a trading card (e.g., a CRC code generated from a unique code of the trading card) may be utilized to detect or correct errors related to incorrect reading of a unique code represented on the trading card. As with the unique code, the size of the error detection code may vary and the bits representing the error detection code may be embedded anywhere in the trading card. For example, in some embodiments, a 10-bit error detection code may be embedded along a particular side of the trading card or be distributed at known locations within the unique code itself.

In-Game Content

In an implementation, once obtained, a unique code of a trading card may be utilized to activate one or more benefits associated with the trading card in a game. As an example, if a unique code of a physical trading card is obtained during a user's game session, virtual card collection subsystem 144 may obtain a virtual trading card corresponding to the physical trading card based on the unique code of the physical trading card, and add the corresponding virtual trading card to the user's virtual card collection in the game (e.g., by associating the corresponding virtual trading card with the user's identifier associated with the user's account). In one use case, after the corresponding virtual trading card is added to the user's virtual card collection, the user may utilize the virtual trading card to battle other users in the game, trade the virtual trading card with other users in the game for other in-game benefits (e.g., other virtual trading cards, virtual currency, or other benefits), etc. Game space subsystem 142 may, for example, provide a battle arena in which users may battle one another with their respective virtual trading cards, an in-game marketplace in which users may trade their respective virtual trading cards, etc.

As another example, a character in a game, an in-game accessory for use by a character in the game, a power available to a character in the game, or other game item may be associated with a physical trading card. When the unique code of the physical trading card is obtained, user management subsystem 146 may provide the associated game item to the user in the game based on the unique code of the trading card. In one scenario, user management subsystem 146 may activate and add the associated game item to the user's account so that the user can access the associated game item when the user is logged into his/her account (e.g., the game item may be associated with the user's identifier that corresponds to his/her account). When logged in, for example, the user may utilize the game item (e.g., a character) to battle other users in the game.

As another example, trading cards featuring characters or in-game items duplicative of characters or in-game items previously added to a user's account may be used to provide additional benefits to the user. For example, if a user had previously added a particular character to his/her account, presenting another trading card featuring the same character—but different unique code—to the system could provide additional benefits to the user such as increasing the level, powers, or items of the character.

In an implementation, a trading card may be utilized to provide one or more augmented reality aspects (e.g., of a game). As an example, upon detecting a character in a game, an in-game accessory for use by a character in the game, a power available to a character in the game, or other game item that is depicted on a physical trading card, game space subsystem 142 may provide a virtual counterpart corresponding to the depicted game item for presentation to a user (e.g., on the user's device). In one use case, the virtual counterpart (and other game-related components such as in-game characters, objects, and user interface components such as energy meters, menus, score displays, etc.) may be overlaid over an input scene (e.g., a real-world image stream being captured by a user device). The user may also be enabled to interact with the virtual counterpart. For example, game space subsystem 142 may detect the user's actions in the image stream (e.g., a user may swipe at the virtual counterpart, "touch" the virtual counterpart, etc., within the viewpoint of a user device), and cause the virtual counterpart to "react" to the detected user action.

As previously noted, although implementations described herein are with respect to trading cards, it is understood that (to the extent possible) other objects may be used in place of trading cards in other implementations. Non-limiting examples of other objects that may be used in place of trading cards include, for instance, figurines (e.g., action figures or other figurines), figurine accessories, real-world items that correspond to game items, or other objects. As an example, a graphical representation of a unique code for identifying a figurine or figurine accessory may be generated, and used to print the figurine or figurine accessory (e.g., via a 3D printing system) such that the printed figurine or figurine accessory comprises the graphical representation of the unique code.

As a further example, the figurine or figurine accessory may correspond to a game item (e.g., a corresponding character or character accessory in a game), and a user may "unlock," activate, or otherwise access the game item so that it is available for use by the user during gameplay in the game. In one use case, for instance, a scanner, or other input device associated with user device 106 may be used to capture an input scene comprising the figurine or figurine accessory (or other objects).

Exemplary Flowcharts

Figure 8:
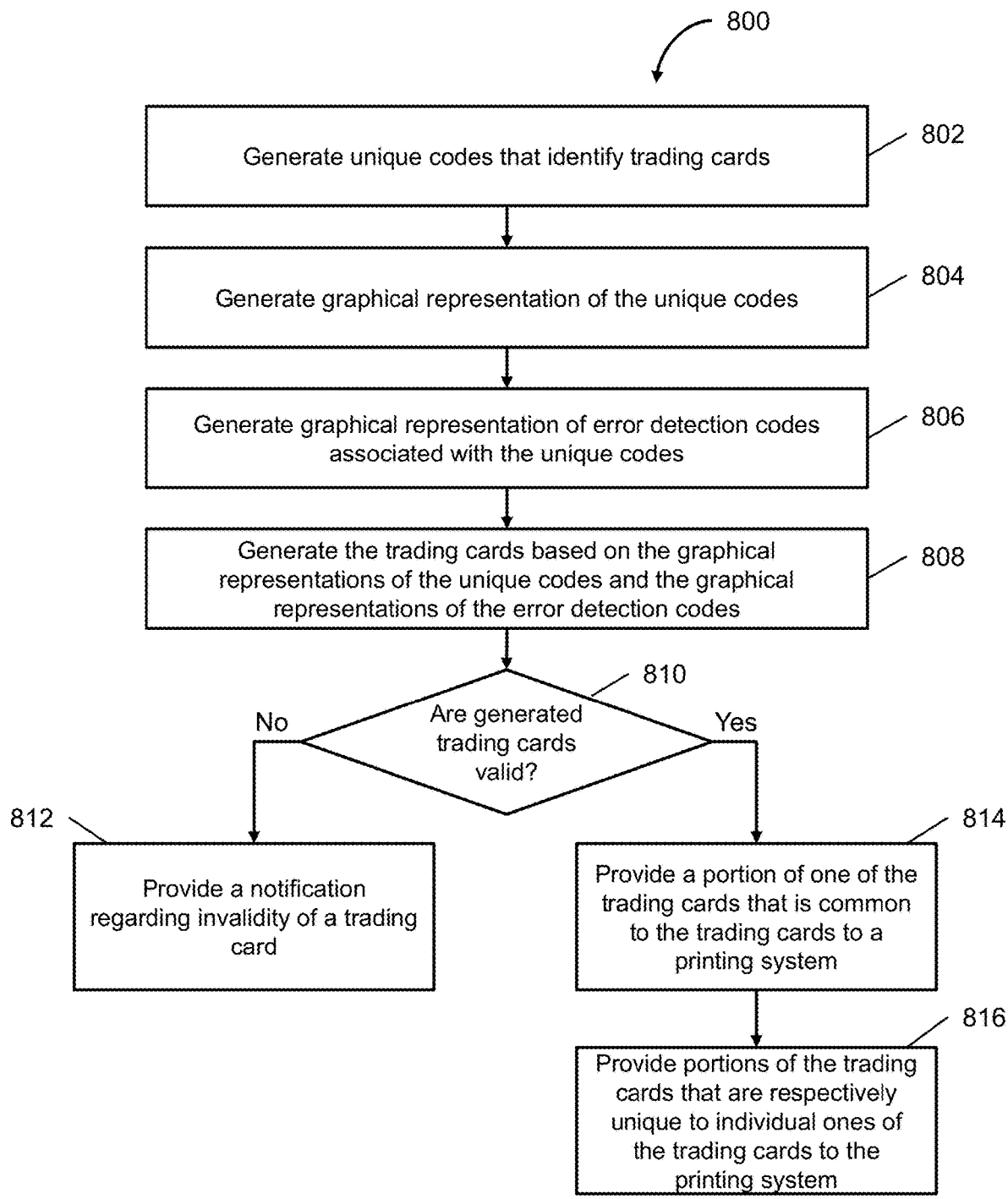
FIG. 8 is an exemplary illustration of a flowchart of a method of creating and printing physical trading cards, according to an implementation of the invention.
Figure 9:
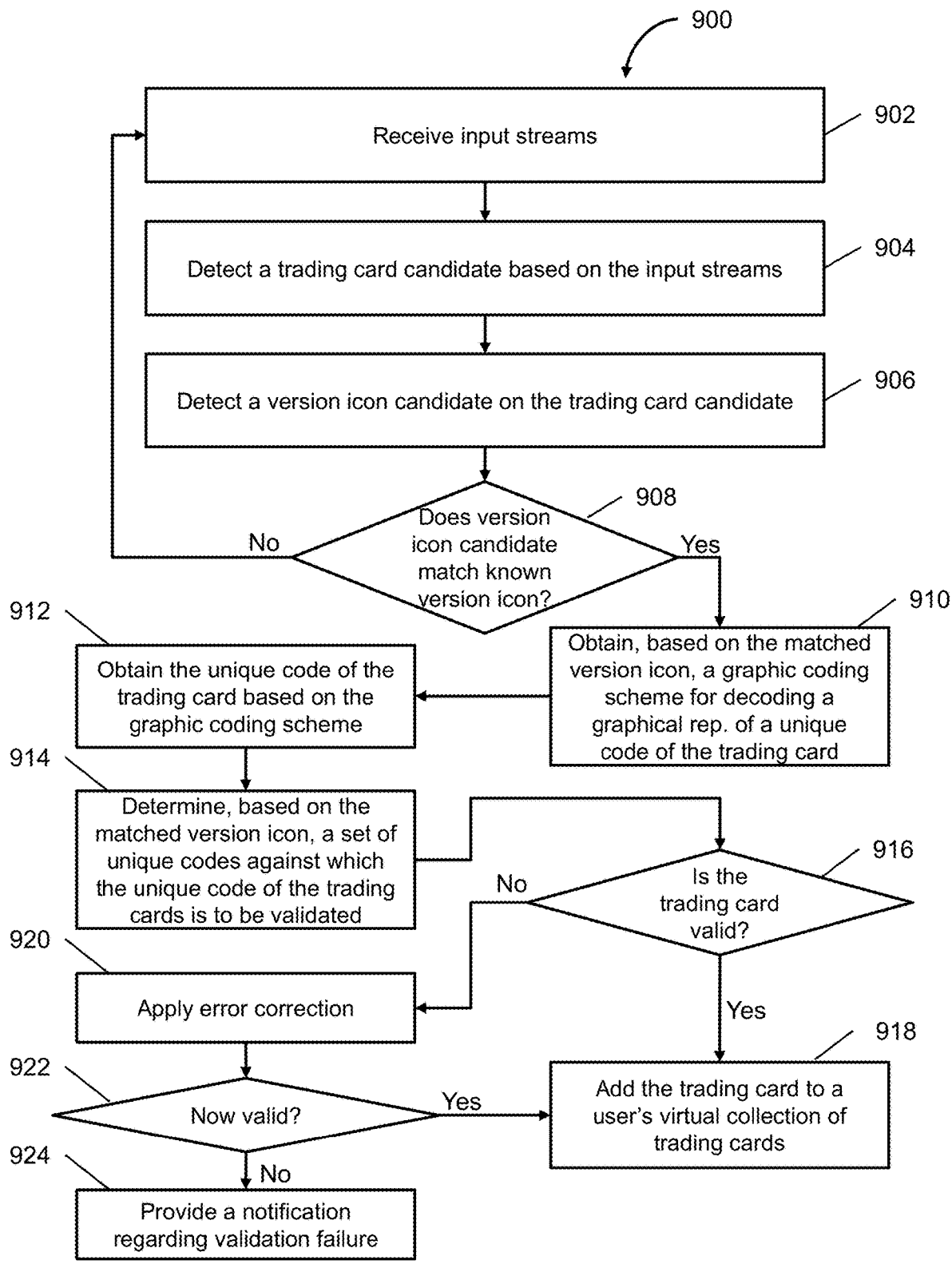
FIG. 9 is an exemplary illustration of a flowchart of a method of identifying and validating trading cards, according to an implementation of the invention.

FIGS. 8 and 9 comprise exemplary illustrations of flowcharts of processing operations of methods that enable the various features and functionality of the system as described in detail above. The processing operations of each method presented below are intended to be illustrative and non-limiting. In some implementations, for example, the methods may be accomplished with one or more additional operations not described, and/or without one or more of the operations discussed. Additionally, the order in which the processing operations of the methods are illustrated (and described below) is not intended to be limiting.

In some implementations, the methods may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of the methods in response to instructions stored electronically on an electronic storage medium. The one or more processing devices may include one or more devices configured through hardware, firmware, and/or software to be specifically designed for execution of one or more of the operations of the methods.

FIG. 8 is an exemplary illustration of a flowchart of a method of creating and printing physical trading cards, according to an implementation of the invention.

In an operation 802, one or more unique codes that identify one or more trading cards may be generated. Operation 802 may be performed by a card code generation subsystem that is the same as or similar to card code generation subsystem 122, in accordance with one or more implementations.

In an operation 804, one or more graphical representations of the unique codes may be generated. As an example, a graphic coding scheme (e.g., a graphic encoding scheme) may be selected based on a trading card version to which the trading cards correspond. The graphical representations of the unique codes may be generated based on the selected graphic coding scheme. Operation 804 may be performed by a graphic coding subsystem that is the same as or similar to graphic coding subsystem 124, in accordance with one or more implementations.

In an operation 806, one or more graphical representations of one or more error detection codes associated with the unique codes may be generated. As an example, a graphic coding scheme (e.g., a graphic encoding scheme) may be selected based on a trading card version to which the trading cards correspond. The graphical representations of the error detection codes may be generated based on the selected graphic coding scheme. Operation 806 may be performed by a graphic coding subsystem that is the same as or similar to graphic coding subsystem 124, in accordance with one or more implementations.

In an operation 808, the trading cards may be generated based on the graphical representations of the unique codes and the graphical representations of the error detection codes. Operation 808 may be performed by a card creation subsystem that is the same as or similar to card creation subsystem 126, in accordance with one or more implementations.

In an operation 810, a determination of whether one or more of the generated trading cards are valid trading cards may be effectuated. As an example, an electronic copy of a given trading card may be processed to obtain a graphical representation of a unique code of the trading card, and the graphical representation of the unique code may be processed to obtain the unique code. The obtained unique copy may be compared against a set of valid unique codes. If the obtained unique code matches one of the valid unique codes of the set, it may be determined that the trading card is a valid trading card. On the other hand, if the obtained unique code does not match any of the valid unique codes of the set, it may be determined that the trading card is not valid (e.g., and, thus, a defectively generated trading card). Operation 810 may be performed by a card validation subsystem that is the same as or similar to card validation subsystem 128, in accordance with one or more implementations. As an example, with respect to a given trading card, method 800 may proceed to an operation 812 responsive to a determination that the trading card is not valid. With respect to the trading card, method 800 may proceed to an operation 814 responsive to a determination that the trading card is valid.

In operation 812, a notification regarding invalidity determination of one or more trading cards may be provided. As an example, the notification may be provided to alert one or more users (e.g., an administrator or other user) with respect to a defect in generating one or more of the trading cards. Operation 812 may be performed by a card validation subsystem that is the same as or similar to card validation subsystem 128, in accordance with one or more implementations.

In operation 814, a portion of one of the trading cards that is common to the trading cards (e.g., a "common" portion) may be provided to a printing system (e.g., without providing other portions of other ones of the trading cards that corresponds to the "common" portion of the one trading card). As an example, only because the portion is common to all trading cards of the given set of trading cards, other portions of other ones of the trading cards that correspond to the "common" portion (of the one trading card) do not necessarily need to be provided to the printing system. Operation 814 may be performed by a card printing subsystem that is the same as or similar to card printing subsystem 130, in accordance with one or more implementations.

In an operation 816, portions of the trading cards that are respectively unique to individual ones of the trading cards may be provided to the printing system. Operation 816 may be performed by a card printing subsystem that is the same as or similar to card printing subsystem 130, in accordance with one or more implementations.

FIG. 9 is an exemplary illustration of a flowchart of a method of detecting and validating trading cards, according to an implementation of the invention.

In an operation 902, one or more input streams may be received. Operation 902 may be performed by an image extraction subsystem that is the same as or similar to image extraction subsystem 132, in accordance with one or more implementations.

In an operation 904, a trading card candidate may be detected based on the input streams. Operation 904 may be performed by an image extraction subsystem that is the same as or similar to image extraction subsystem 132, in accordance with one or more implementations.

In an operation 906, a version icon candidate on the trading card candidate may be detected. Operation 906 may be performed by an image extraction subsystem that is the same as or similar to image extraction subsystem 132, in accordance with one or more implementations.

In an operation 908, a determination of whether the version icon candidate matches a known version icon may be effectuated. Operation 908 may be performed by a card validation subsystem that is the same as or similar to card validation subsystem 128, in accordance with one or more implementations. As an example, method 900 may proceed to operation 902 responsive to a determination that the version icon candidate does not match a known version icon (e.g., the trading card candidate may not be a known trading card). Method 900 may proceed to an operation 910 responsive to a determination that the version icon candidate matches a known version icon (e.g., the trading card candidate may a known trading card).

In operation 910, a graphic coding scheme (for decoding a graphical representation of a unique code of the trading card (or the trading card candidate) may be obtained based on the matched version icon. Operation 910 may be performed by a card validation subsystem that is the same as or similar to card validation subsystem 128, in accordance with one or more implementations.

In an operation 912, the unique code of the trading may be obtained based on the graphic coding scheme. Operation 912 may be performed by a card validation subsystem that is the same as or similar to card validation subsystem 128, in accordance with one or more implementations.

In an operation 914, a set of unique codes (against which the obtained unique code of the trading card is to be validated) may be determined based on the matched version icon. Operation 914 may be performed by a card validation subsystem that is the same as or similar to card validation subsystem 128, in accordance with one or more implementations.

In an operation 916, a determination of whether the trading card is a valid trading card may be effectuated. As an example, the determination may be based on a comparison of the obtained unique code against the obtained set of unique codes (which are known to be valid unique codes). If the obtained unique code matches one of the known valid unique codes, it may be determined that the trading card is a valid trading card. On the other hand, if the obtained unique code does not match any of the known valid unique codes, it may be determined that the trading card is not a valid trading card. Operation 916 may be performed by a card validation subsystem that is the same as or similar to card validation subsystem 128, in accordance with one or more implementations. As an example, method 900 may proceed to an operation 918 responsive to a determination that the trading card is a valid trading card. Method 900 may proceed to an operation 920 responsive to a determination that the trading card is not a valid trading card.

In operation 918, the trading card may be added to a user's virtual collection of trading cards. As an example, a user may scan a physical copy of the trading card to add the trading card to the user's virtual trading card collection in a game (e.g., so that the virtual copy of the trading card may be utilized by the user in the game to carry out one or more objectives of the game). If the trading card is determined to be valid, the trading card may be added to the user's virtual trading card collection, and the virtual copy of the trading card may be activated for the user to use in the game. Operation 918 may be performed by a virtual card collection subsystem that is the same as or similar to virtual card collection subsystem 144, in accordance with one or more implementations.

In operation 920, error correction may be applied (e.g., to the unique code obtained from decoding a graphical representation thereof) to attempt to obtain a valid unique code. Operation 920 may be performed by a card validation subsystem that is the same as or similar to card validation subsystem 128, in accordance with one or more implementations.

In an operation 922, a determination of whether the trading card is a valid trading card may be effectuated. As an example, after error correction is applied, a unique code obtained from decoding a graphical representation thereof, the error-corrected unique code may be compared against a set of unique codes (which are known to be valid unique codes) to determine whether the error-corrected unique code matches one of the known valid unique codes. Operation 922 may be performed by a card validation subsystem that is the same as or similar to card validation subsystem 128, in accordance with one or more implementations. As an example, method 900 may proceed to an operation 918 responsive to a determination that the trading card is a valid trading card. Method 900 may proceed to an operation 924 responsive to a determination that the trading card is not a valid trading card.

In operation 924, a notification regarding a validation failure may be provided. As an example, when a user scans a physical copy of the trading card, and the processing of the scan results in an invalidity determination, a notification regarding the validation failure may be provided to the user. In some embodiments, a user may be "locked out" of the trading card detection and validation process after a certain number of validation failures within a certain period of time. For example, three validation failures within a ten-minute time period may cause a one-hour lockout. In some embodiments, the lockout period may progressively increase as validation failures accumulate. In some embodiments, repeated validation failures relating to a particular unique code may be handled differently from multiple validation failures relating to different unique codes. In particular, the latter scenario may indicate a brute force attempt at randomly guessing valid codes, while the former may be more indicative of a genuine detection error. Operation 924 may be performed by a card validation subsystem that is the same as or similar to card validation subsystem 128, in accordance with one or more implementations.

Other implementations, uses and advantages of the invention will be apparent to those skilled in the art from consideration of the specification and practice of the invention disclosed herein. For example, though certain embodiments above relate to a system and method for creating uniquely identifiable trading cards, one of skill in the art will appreciate that the disclosed techniques can also be applied to other physical objects. The specification should be considered exemplary only, and the scope of the invention is accordingly intended to be limited only by the following claims.

What is claimed is:

1. A method of creating trading cards for use with a video game and integrating associated unique codes as part of the content of the trading cards, the method being implemented in a computer system having one or more physical processors programmed with computer program instructions which, when executed by the one or more physical processors, cause the computer system to perform the method, the method comprising:
    obtaining, by the computer system, a unique code that identifies a trading card;
    generating, by the computer system, based on a graphic coding scheme, a graphical representation of the unique code, wherein the graphical representation is a visually perceptible non-alphanumeric representation of the unique code and is part of a non-unique depiction of a game item that is usable in the video game and wherein the graphic coding scheme is configured to transform the unique code into the graphical representation of the unique code;
    generating, by the computer system and based on the graphic coding scheme, a graphical representation of an error code, wherein the graphic coding scheme is configured to transform the error code into the graphical representation of the error code;
    obtaining, by the computer system, content associated with the depiction of the game item;
    generating, by the computer system, the trading card based on the content associated with the depiction of the game item, the graphical representation of the error code, and the graphical representation of the unique code such that the generated trading card depicts the game item, the graphical representation of the error code, and the graphical representation of the unique code;
    using a card validation system to acquire and determine the unique code from the trading card and to acquire and determine the error code from the trading card; and
    using the error code, by the card validation subsystem, to detect and/or correct an error relating to an incorrect determination of the unique code.

2. The method of claim 1, wherein the game item comprises at least one of: (1) a character in the video game that is to be depicted on the trading card; (2) an in-game accessory for use in the video game that is to be depicted on the trading card; or (3) a power for use in the video game that is to be depicted on the trading card.

3. The method of claim 1, wherein the graphical representation of the unique code comprises respective graphical representations of bits corresponding to the unique code.

4. The method of claim 1, wherein the graphical representation of the unique code comprises at least one of: (1) an aspect of a character in the video game that is to be depicted on the trading card; (2) an aspect of an in-game accessory in the video game that is to be depicted on the trading card; or (3) an aspect of a power in the video game that is to be depicted on the trading card.

5. The method of claim 1, further comprising:
    obtaining, by the computer system, versioning information associated with the trading card, wherein the versioning information identifies a trading card set version; and
    selecting, by the computer system, the graphic coding scheme based on the trading card set version;
    wherein the graphic coding scheme is used to generate the graphical representation of the unique code based on the selection of the graphic coding scheme.

6. The method of claim 5, further comprising:
    obtaining, by the computer system, a version icon based on the trading card set version;
    wherein the trading card is generated based on the content associated with the depiction of the game item, the graphical representation of the unique code, and the version icon such that the generated trading card depicts the game item, the graphical representation of the unique code, and the version icon.

7. The method of claim 5, further comprising:
    obtaining, by the computer system, based on the trading card set version, a template for generating the trading card;
    wherein the trading card is generated based on the content associated with the depiction of the game item, the graphical representation of the unique code, and the template such that the generated trading card depicts the game item and the graphical representation of the unique code in accordance with the template.

8. The method of claim 1, wherein a set of trading cards comprises the trading card and one or more other trading cards, the method further comprising:
providing, by the computer system, to a printing system, information related to a first portion of the generated trading card that is unique to the generated trading card with respect to the set of trading cards;
providing, by the computer system, to the printing system, information related to a second portion of the generated trading card that is common to the set of trading cards;
providing, by the computer system, to the printing system, an indication that the information related to the second portion of the generated trading card is to be used to respectively print a corresponding portion of the one or more other trading cards;
providing, by the computer system, to the printing system, information related to one or more portions of the one or more other trading cards that are respectively unique to the one or more other trading cards with respect to the set of trading cards;
wherein the generated trading card is printed based on the information related to the first portion of the generated trading card and the information related to the second portion of the generated trading card; and
wherein the one or more other trading cards are printed based on the information related to the one or more other portions of the one or more other trading cards, the information related to the second portion of the generated trading card, and the indication that the information related to the second portion of the generated trading card is to be used to respectively print a corresponding portion of the one or more other trading cards.

9. The method of claim 8, further comprising:
obtaining, by the computer system, from the printing system, a request for information related to a trading card portion that is common to the set of trading cards;
wherein the indication that the information related to the second portion of the generated trading card is to be used to respectively print a corresponding portion of the one or more other trading cards is provided by providing, by the computer system, the information related to the second portion of the generated trading card in response to the request for the information related to the common trading card portion.

10. The method of claim 8, wherein providing the indication comprises providing one or more printing instructions indicating that the information related to the second portion of the generated trading card is to be used to respectively print a corresponding portion of the one or more other trading cards.

11. A system for creating trading cards for use with a video game and integrating associated unique codes as part of the content of the trading cards, the system comprising:
a computer system comprising one or more physical processors programmed with computer program instructions which, when executed by the one or more physical processors, causes the computer system to:
obtain a unique code that identifies a trading card;
generate, based on a graphic coding scheme, a graphical representation of the unique code, wherein the graphical representation is a visually perceptible non-alphanumeric representation of the unique code and is part of a non-unique depiction of a game item that is usable in the video game and wherein the graphic coding scheme is configured to transform the unique code into the graphical representation of the unique code;
generate, based on the graphic coding scheme, a graphical representation of an error code, wherein the graphic coding scheme is configured to transform the error code into the graphical representation of the error code;
obtain content associated with the depiction of the game item; and
generate the trading card based on the content associated with the depiction of the game item, the graphical representation of the error code, and the graphical representation of the unique code such that the generated trading card depicts the game item, the graphical representation of the error code, and the graphical representation of the unique code; and
a card validation system comprising one or more physical processors programmed with computer program instructions which, when executed by the one or more physical processors, causes the card validation system to:
acquire and determine the unique code from the trading card and to acquire and determine the error code from the trading card; and
use the error code to detect and/or correct an error relating to an incorrect determination of the unique code.

12. The system of claim 11, wherein the game item comprises at least one of: (1) a character in the video game that is to be depicted on the trading card; (2) an in-game accessory for use in the video game that is to be depicted on the trading card; or (3) a power for use in the video game that is to be depicted on the trading card.

13. The system of claim 11, wherein the graphical representation of the unique code comprises respective graphical representations of bits corresponding to the unique code.

14. The system of claim 11, wherein the graphical representation of the unique code comprises at least one of: (1) an aspect of a character in the video game that is to be depicted on the trading card; (2) an aspect of an in-game accessory in the video game that is to be depicted on the trading card; or (3) an aspect of a power in the video game that is to be depicted on the trading card.

15. The system of claim 11, wherein the computer system is further caused to:
obtain versioning information associated with the trading card, wherein the versioning information identifies a trading card set version; and
select the graphic coding scheme based on the trading card set version;
wherein the graphic coding scheme is used to generate the graphical representation of the unique code based on the selection of the graphic coding scheme.

16. The system of claim 15, wherein the computer system is further caused to:
obtain a version icon based on the trading card set version;
wherein the trading card is generated based on the content associated with the depiction of the game item, the graphical representation of the unique code, and the version icon such that the generated trading card depicts the game item, the graphical representation of the unique code, and the version icon.

17. The system of claim 15, wherein the computer system is further caused to:

obtain, based on the trading card set version, a template for generating the trading card;
wherein the trading card is generated based on the content associated with the depiction of the game item, the graphical representation of the unique code, and the template such that the generated trading card depicts the game item and the graphical representation of the unique code in accordance with the template.

18. The system of claim 11, wherein a set of trading cards comprises the trading card and one or more other trading cards, and wherein the computer system is further caused to:
provide, to a printing system, information related to a first portion of the generated trading card that is unique to the generated trading card with respect to the set of trading cards;
provide, to the printing system, information related to a second portion of the generated trading card that is common to the set of trading cards;
provide, to the printing system, an indication that the information related to the second portion of the generated trading card is to be used to respectively print a corresponding portion of the one or more other trading cards;
provide, to the printing system, information related to one or more portions of the one or more other trading cards that are respectively unique to the one or more other trading cards with respect to the set of trading cards;
wherein the generated trading card is printed based on the information related to the first portion of the generated trading card and the information related to the second portion of the generated trading card; and
wherein the one or more other trading cards are printed based on the information related to the one or more other portions of the one or more other trading cards, the information related to the second portion of the generated trading card, and the indication that the information related to the second portion of the generated trading card is to be used to respectively print a corresponding portion of the one or more other trading cards.

19. The system of claim 18, wherein the computer system is further caused to:
obtain, from the printing system, a request for information related to a trading card portion that is common to the set of trading cards;
wherein the indication that the information related to the second portion of the generated trading card is to be used to respectively print a corresponding portion of the one or more other trading cards is provided by providing the information related to the second portion of the generated trading card in response to the request for the information related to the common trading card portion.

20. The system of claim 18, wherein providing the indication comprises providing one or more printing instructions indicating that the information related to the second portion of the generated trading card is to be used to respectively print a corresponding portion of the one or more other trading cards.

21. A computer program product for creating trading cards for use with a video game and integrating associated unique codes as part of the content of the trading cards, the computer program product comprising:
one or more tangible, non-transitory computer-readable storage devices;
a first plurality of program instructions, stored on at least one of the one or more tangible, non-transitory computer-readable tangible storage devices that, when executed, causes a computer to:
generate, based on a graphic coding scheme, a graphical representation of the unique code, wherein the graphical representation is a visually perceptible non-alphanumeric representation of the unique code and is part of a non-unique depiction of a game item that is usable in the video game and wherein the graphic coding scheme is configured to transform the unique code into the graphical representation of the unique code;
generate, based on the graphic coding scheme, a graphical representation of an error code, wherein the graphic coding scheme is configured to transform the error code into the graphical representation of the error code;
obtain content associated with the depiction of the game item;
generate the trading card based on the content associated with the depiction of the game item, the graphical representation of the error code, and the graphical representation of the unique code such that the generated trading card depicts the game item, the graphical representation of the error code, and the graphical representation of the unique code; and
a second plurality of program instructions, stored on at least one of the one or more tangible, non-transitory computer-readable tangible storage devices that, when executed, causes a card validation system to:
acquire and determine the unique code from the trading card and to acquire and determine the error code from the trading card; and
use the error code to detect and/or correct an error relating to an incorrect determination of the unique code.

* * * * *